Jan. 29, 1929.
E. J. ABBOTT ET AL
1,700,425
AUTOMATIC WINDING MACHINE
Filed Dec. 7, 1926     14 Sheets-Sheet 4
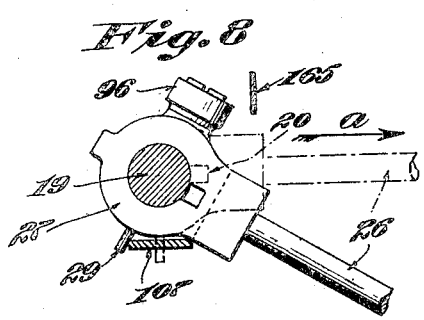
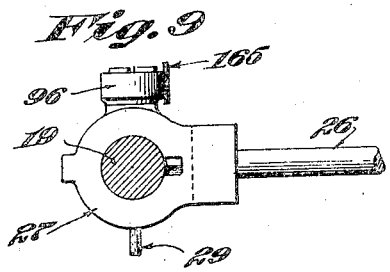
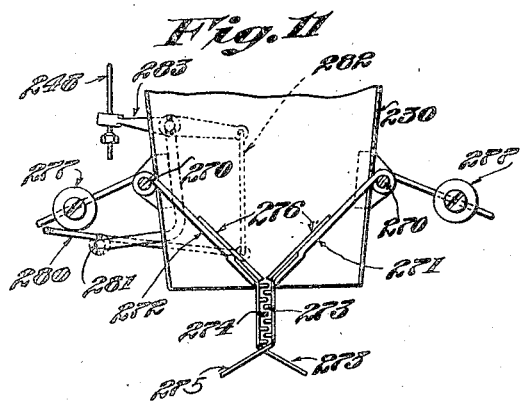
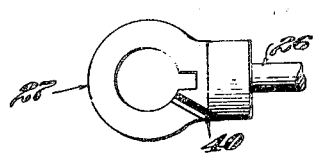
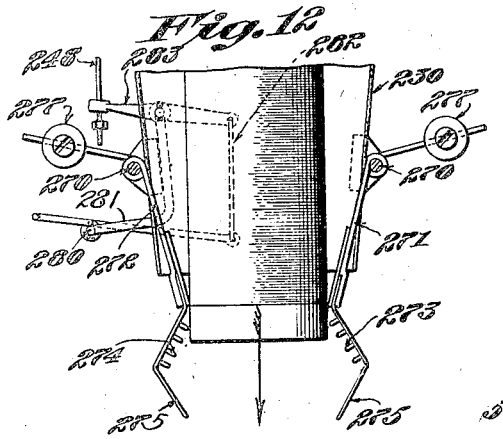
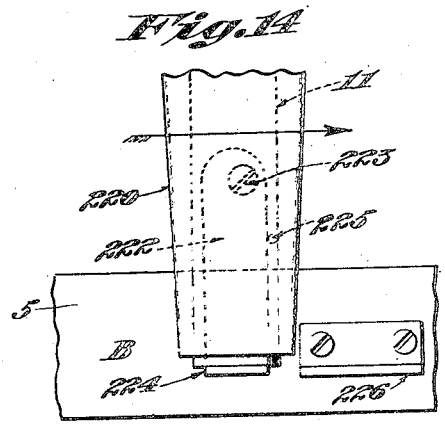
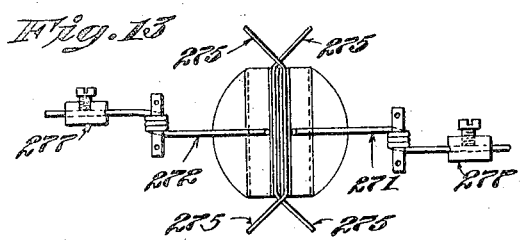
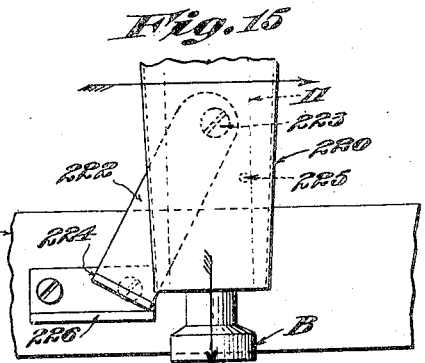

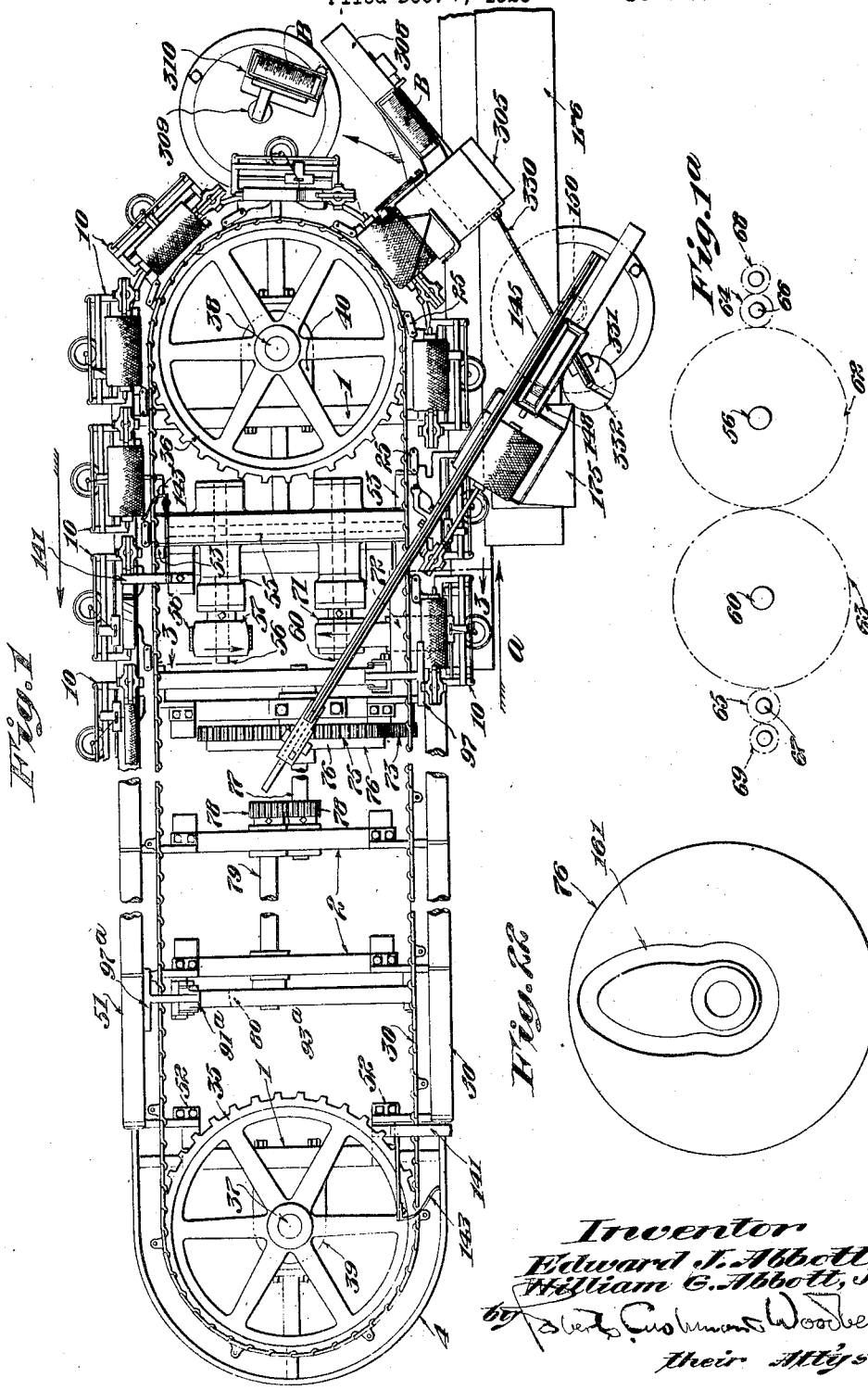

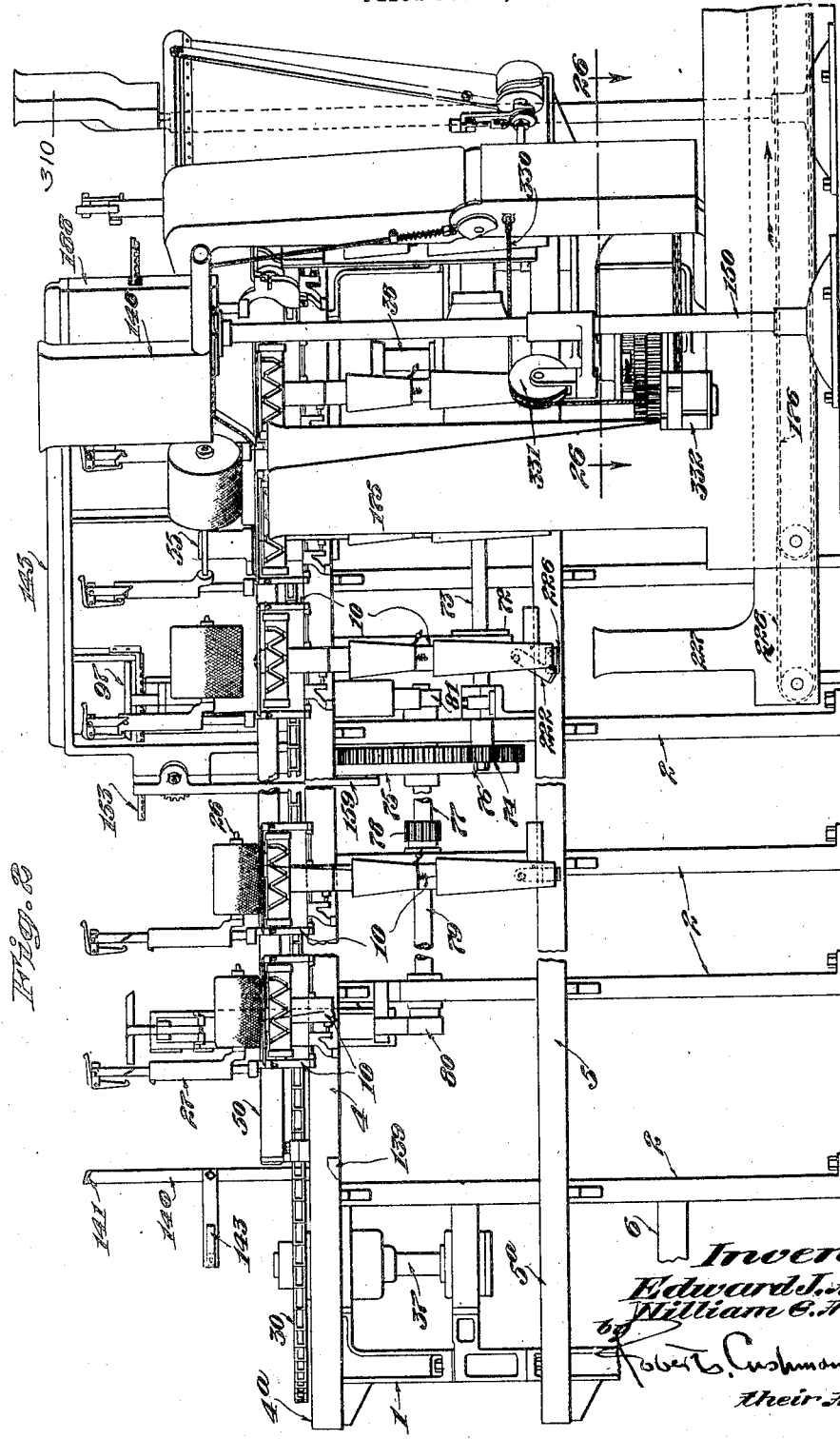

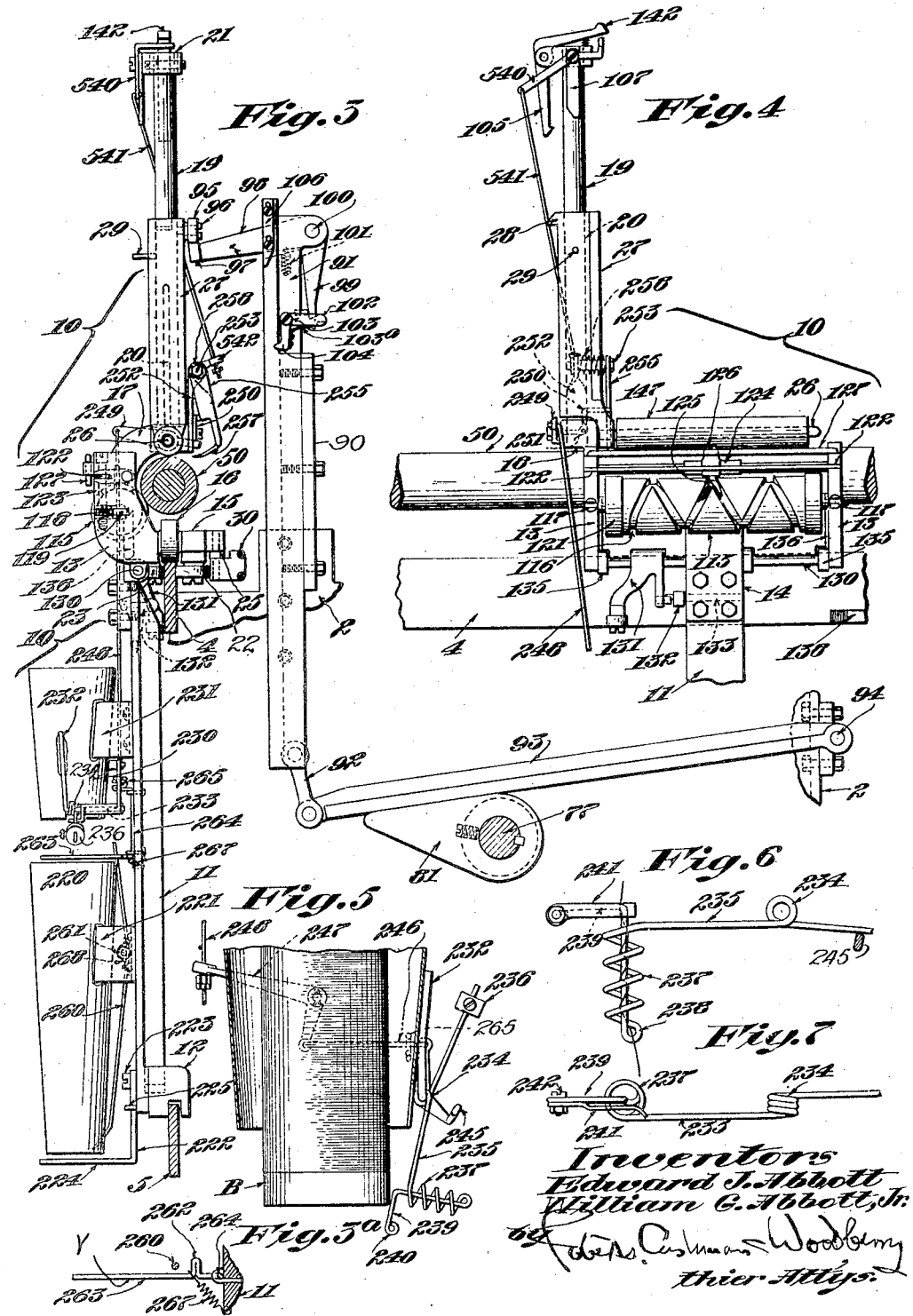

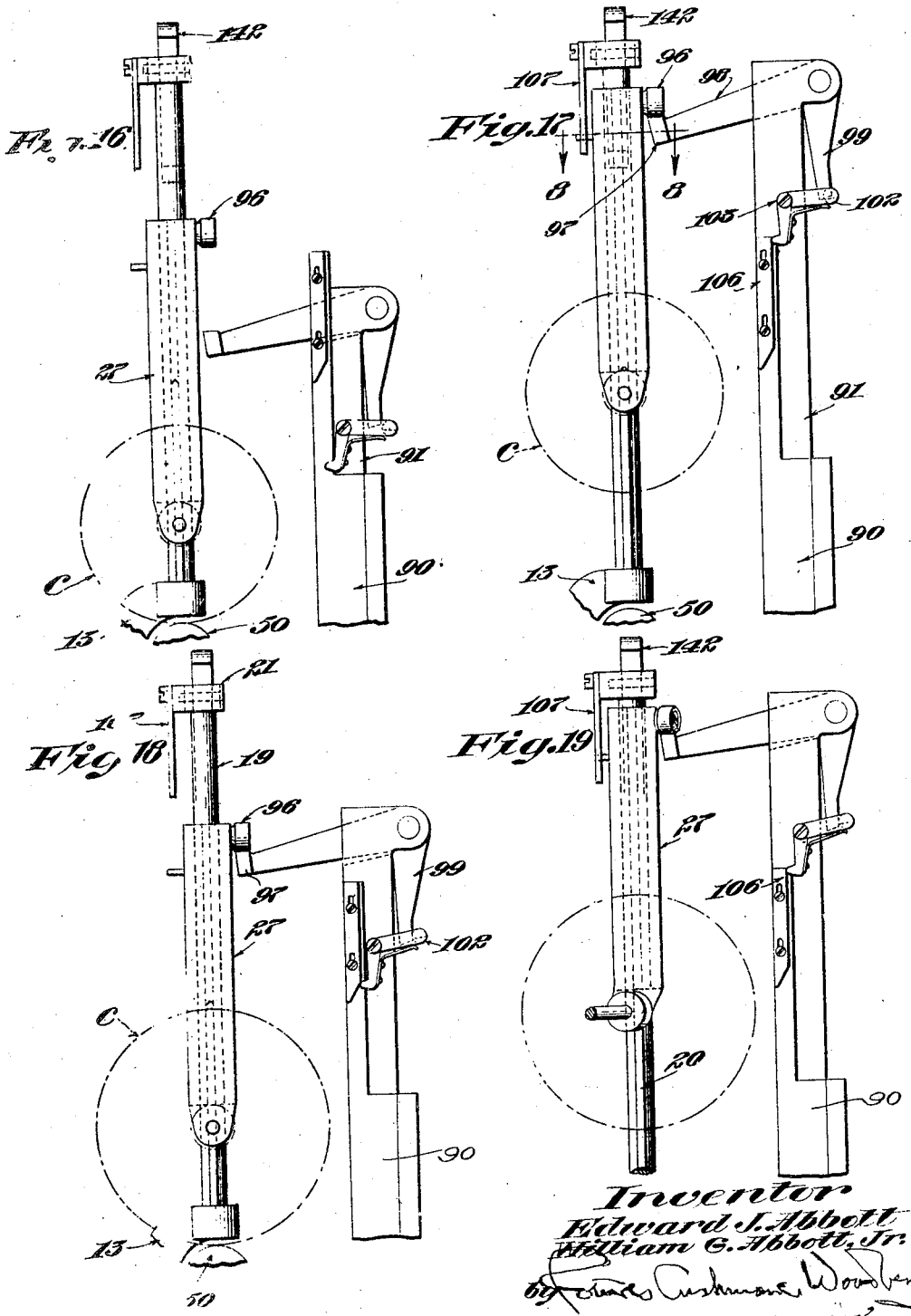

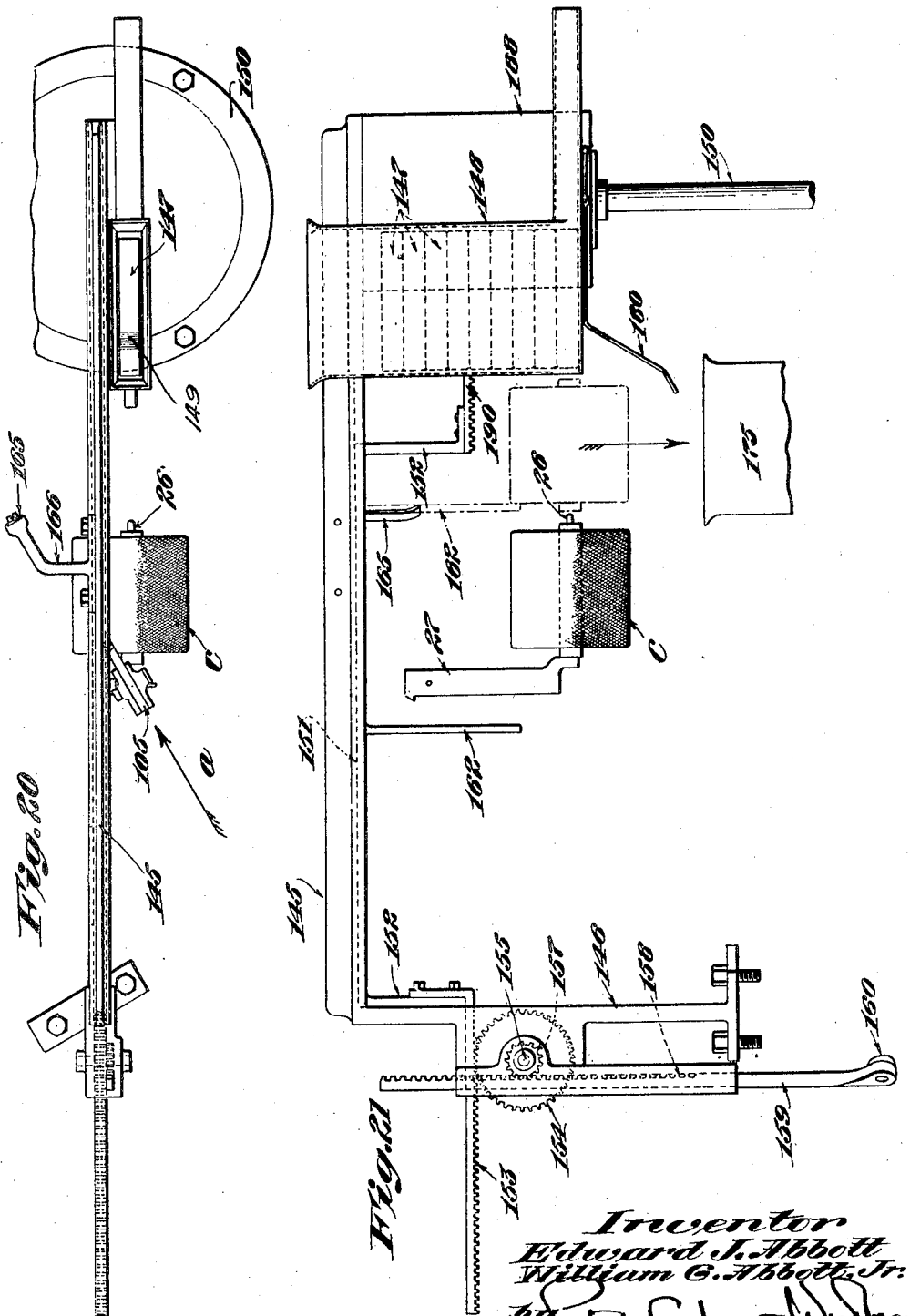

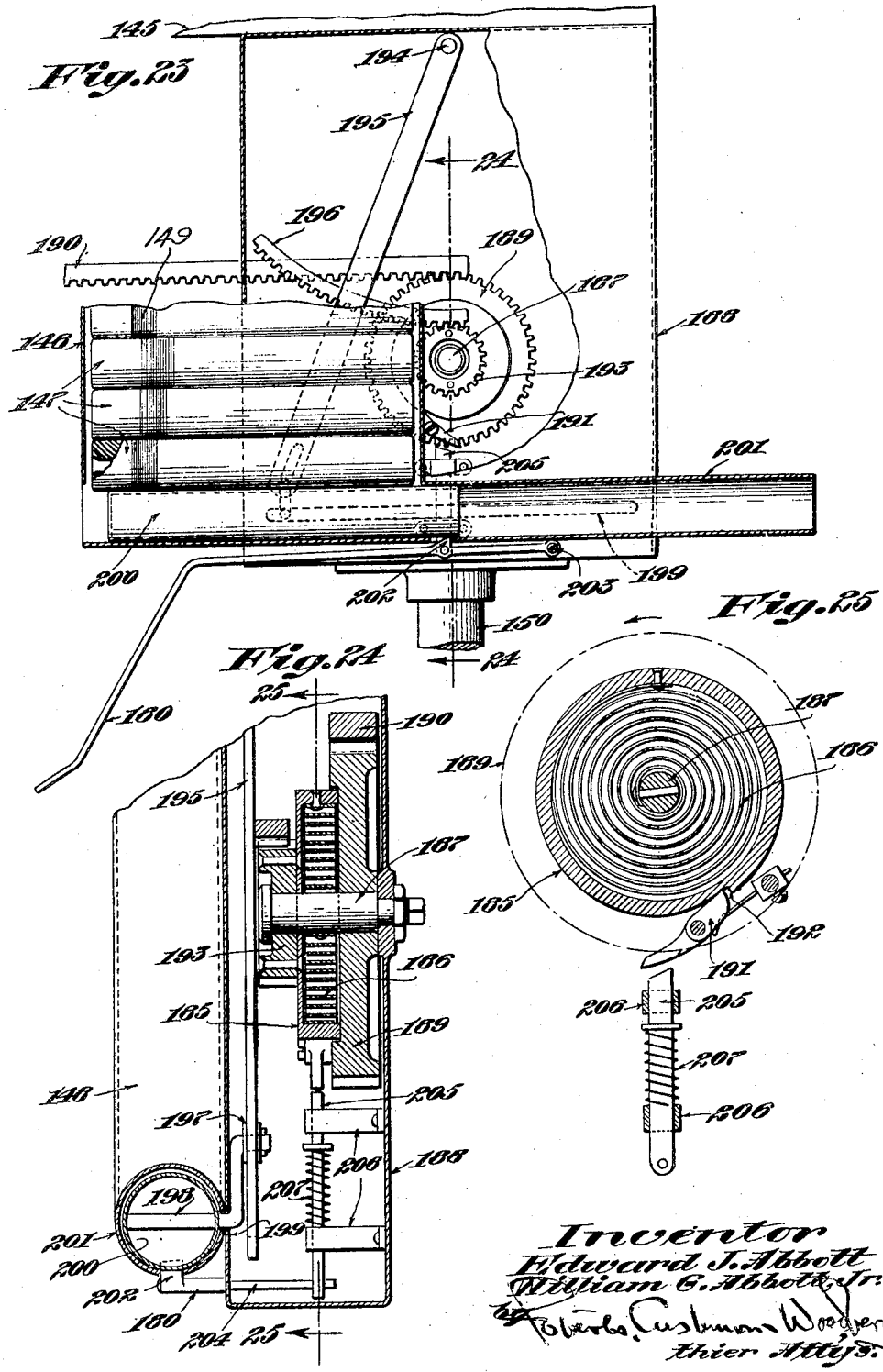

Jan. 29, 1929.  1,700,425
E. J. ABBOTT ET AL
AUTOMATIC WINDING MACHINE
Filed Dec. 7, 1926   14 Sheets-Sheet 8
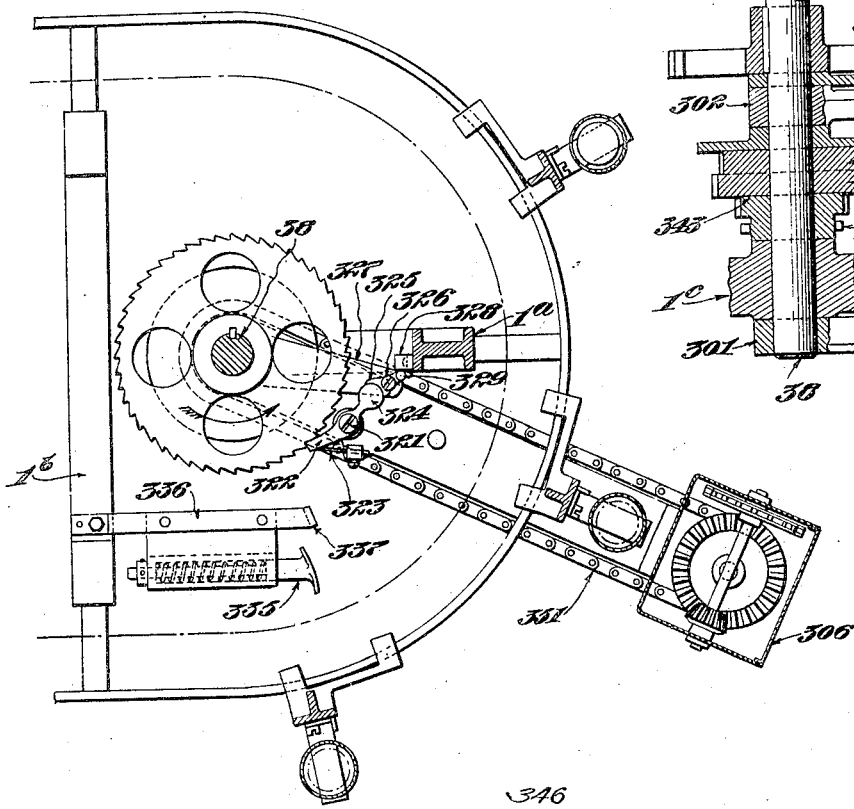
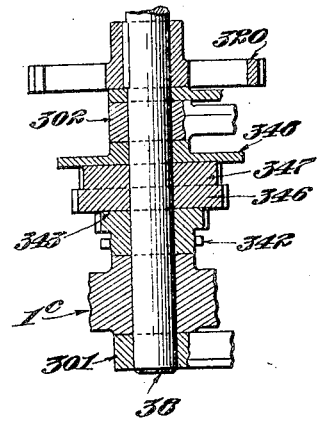
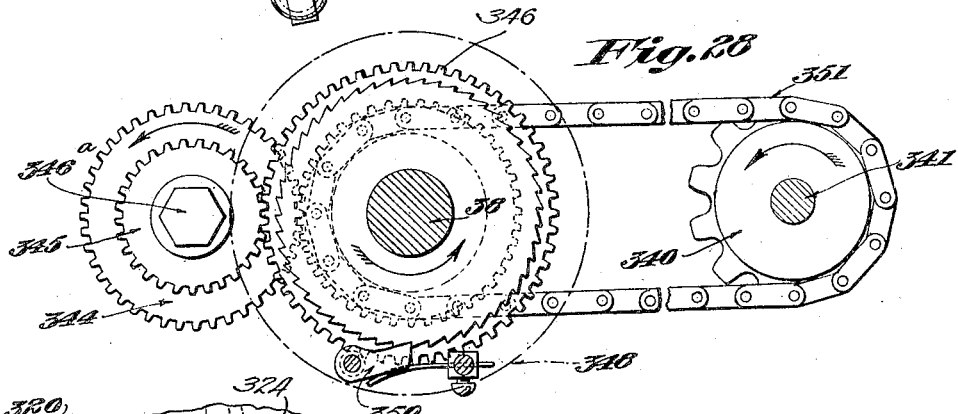

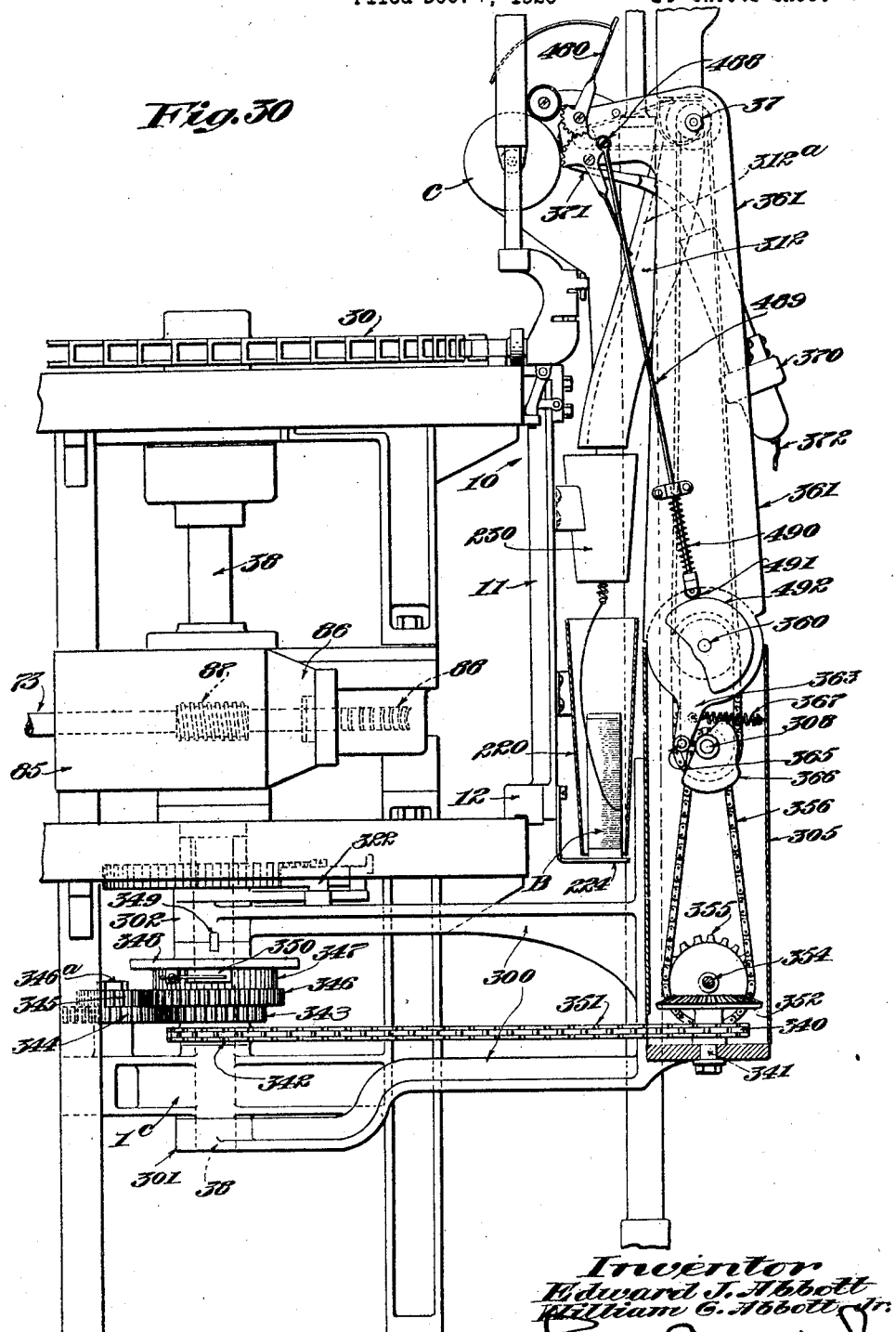

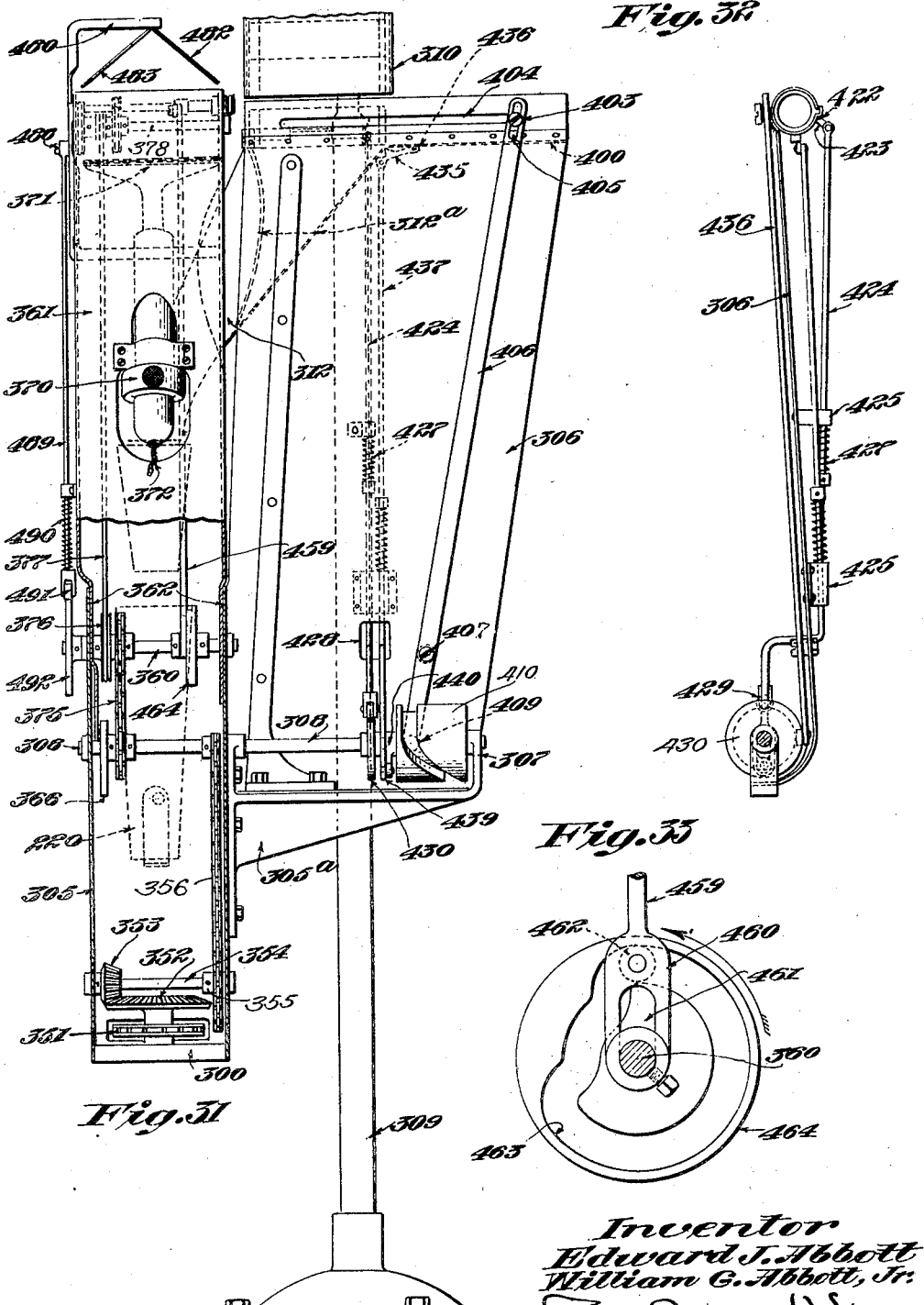

Jan. 29, 1929.  
E. J. ABBOTT ET AL  
1,700,425  
AUTOMATIC WINDING MACHINE  
Filed Dec. 7, 1926   14 Sheets-Sheet 11
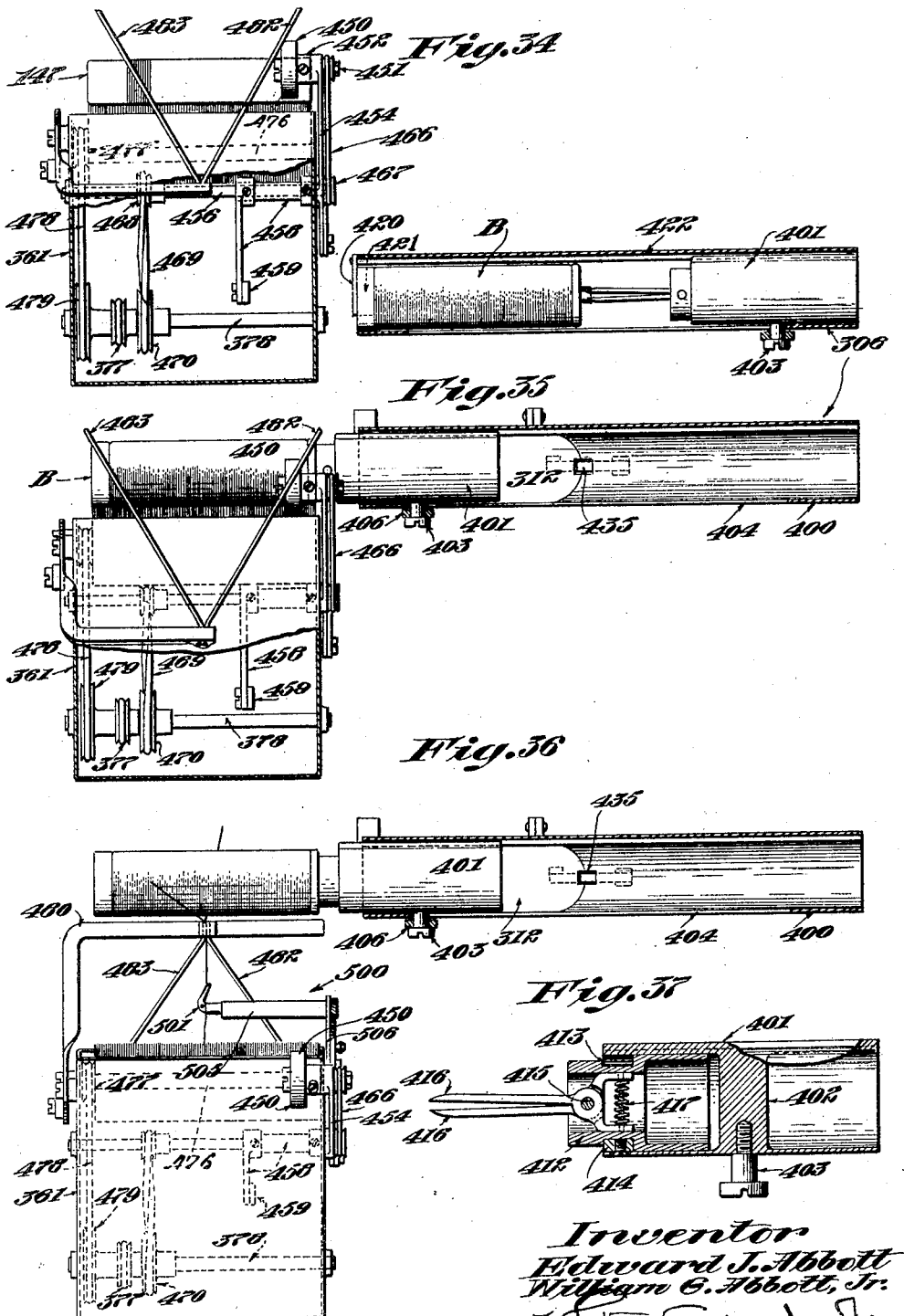

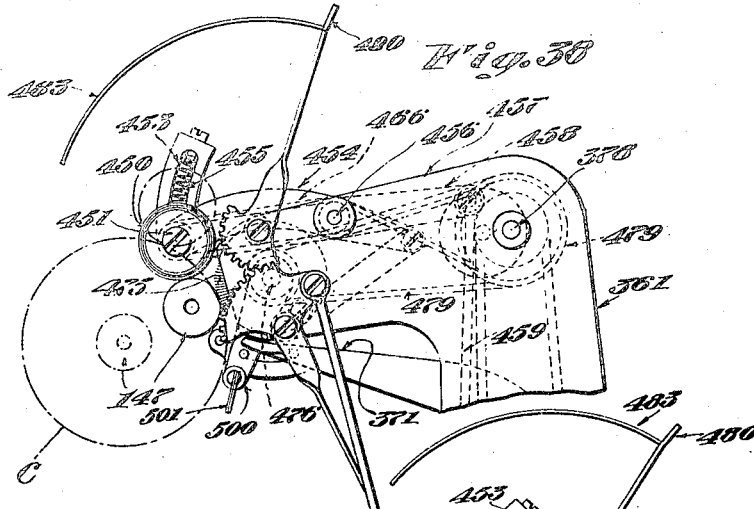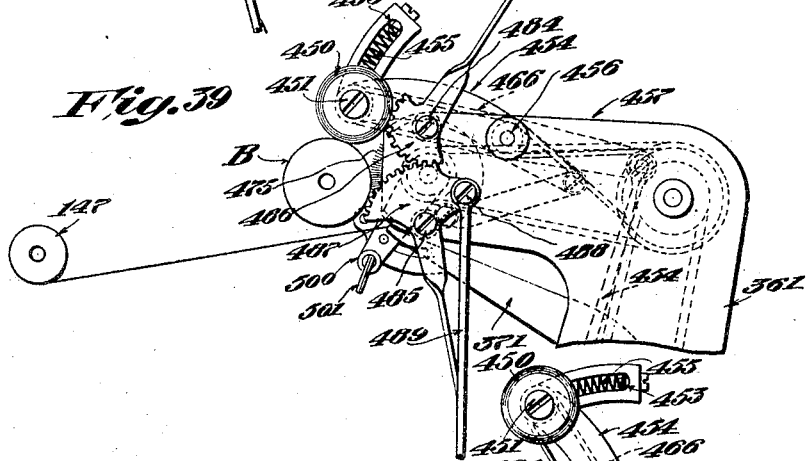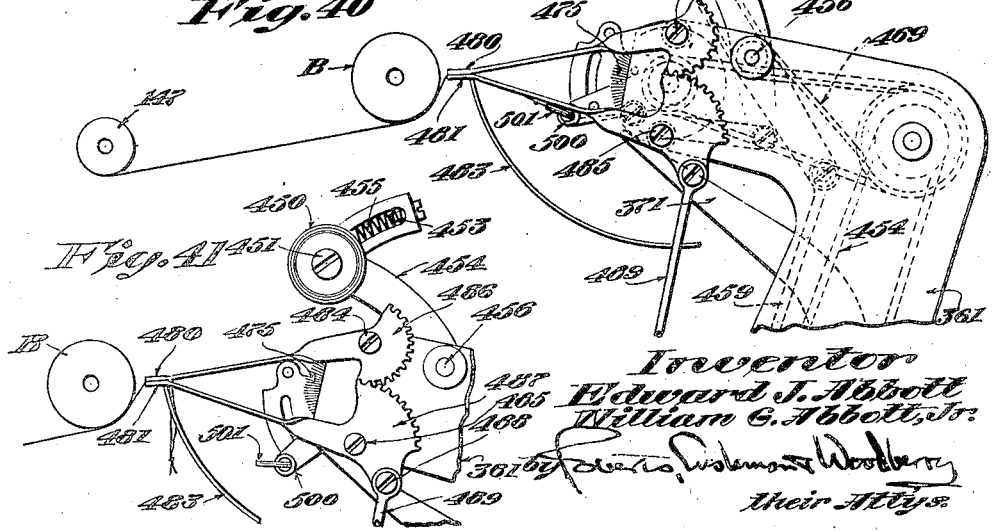

Jan. 29, 1929. 1,700,425
E. J. ABBOTT ET AL
AUTOMATIC WINDING MACHINE
Filed Dec. 7, 1926 14 Sheets-Sheet 13

Inventor
Edward J. Abbott
William G. Abbott, Jr.
by Roberts Cushman Woodbury
their Attys.

Jan. 29, 1929.  1,700,425

E. J. ABBOTT ET AL

AUTOMATIC WINDING MACHINE

Filed Dec. 7, 1926  14 Sheets-Sheet 14

Patented Jan. 29, 1929.  REISSUED  1,700,425

UNITED STATES PATENT OFFICE.

EDWARD J. ABBOTT AND WILLIAM G. ABBOTT, JR., OF WILTON, NEW HAMPSHIRE.

AUTOMATIC WINDING MACHINE.

Application filed December 7, 1926. Serial No. 153,132.

This invention has to do with winding yarn, thread or other filaments (hereinafter referred to as yarn) into traverse-wound packages, such as headless self-sustaining cops, balls or cheeses built up, as usual, of layers of yarn lying in spiral or helical formation, reversals of the direction of pitch of winding occurring at the unsupported end faces constituted of these cusps or reversals. Such a package is suitable for warp for weaving, for rewinding into other packages, for direct use in a warping, knitting, sewing, braiding or other yarn-using machine, or as weft for a continuous-weft loom. As well known to textile artisans, it is necessary to rewind yarn made on a spinning frame and wound on bobbins, for economy of handling and prevention of stoppage of the yarn-using machine, into packages comprising a greater length of yarn than it is possible to wind on the spinning frame bobbin, which can contain a length much less only than that convenient to be used in the ball or cheese constituting the primary yarn supply for the yarn-using machine.

One object of this invention is to provide a machine adapted automatically to wind a self-sustaining headless package comprising the wound lengths of yarn of a plurality of different spinning bobbins or other primary unwinding containers wound on the headless package one after the other, and to provide a machine for this purpose requiring a minimum of attendance which shall be adapted to receive a number of unwinding supply packages, such as spinning bobbins or spools, to wind the contents of unwinding supply bobbins severally into headless traverse-wound packages, and to cause these supplies severally to be replenished automatically by new supplies when exhausted or broken.

In a preferred form, it is a further object of the machine to provide for automatically uniting the exhausted or severed winding end to the leading end of the fresh or replenishment supply; and to provide for tying these two ends together automatically.

Leading to these objects, subordinate objects of the invention are to provide a machine which will detect and remove or doff a complete headless package or cheese; to provide in such a machine automatic devices for discharging a spent unwinding package; to provide in such a machine automatic devices for beginning winding on a fresh spindle, quill, tube or carrier of the leading end of a replenished unwinding supply; and to provide for automatically positioning a fresh unwinding package whenever a predecessor unwinding package is exhausted or its yarn is broken.

A further object of the invention is to provide means to detect and remove knots, enlarging defects, snarls and other imperfections generally known and hereinafter referred to as slubs; or, in case of failure to remove a slub, to break the yarn supply and secure replenishment of the yarn supply; and to provide means to detect breakage or exhaustion of an unwinding supply, and automatically to stop winding of the winding package of that supply until replenishment shall have occured.

A further object of the invention is to provide a machine containing devices to secure some or all of the above objects which will provide for winding the desired kind of wound package during progress of the winding and unwinding yarn packages in a circulatory path and in which the replenishment mechanism the place of delivery of the completed packages, the place of delivery of the spent bobbins and the place of donning or placing a carrier for the winding yarn mass is at one end of the machine, these devices operating at a relatively stationary location.

In pursuit of these objects, the invention provides, among other features and characteristics, in a machine operating to wind one package and unwind another during travel of the winding and unwinding yarn supply, improved devices for supporting, tensioning, detecting exhaustion or breakage of the winding yarn, and for stopping the motion of the winding package upon exhaustion or breakage or the occurrence of a slub, or of any of these; and improved devices for traversing yarn to lay quick-pitched spirals on the surface of a winding container or package during travel along or about a winding machine.

The invention provides devices and combinations of devices for attaining the above and other objects, as well as improved forms of the subordinate combinations and elements of a machine automatically operating to wind the yarns of a plurality of supply bobbins or other unwinding packages in a connected whole on a container or package in the form of a cop, ball or cheese built up of traverse wound layers.

For these purposes, the machine may also include many of the characteristic features and combinations of a machine invented by Edward J. Abbott and described in his application for patent for winding machines, Serial No. 429,695, filed December 10, 1920 [patented December 7, 1926, No. 1,609,639]. We do not herein claim, therefore, the matters common to said application for patent and this application.

In the accompanying drawings we have shown certain species only of the machine of the invention which will now be described with the aid of the specific instances shown in the drawings, in which:

Fig. 1 is a general plan view of a machine embodying the invention, sections of the length of the machine being broken away;

Fig. 1ª is a detail diagram elevation of certain gearing;

Fig. 2 is a side elevation corresponding to Fig. 1;

Fig. 3 is a typical cross section in elevation on the line 3—3 of Fig. 1, showing a carrier for the winding and unwinding packages and parts of the doffing, stopping and resetting mechanism;

Fig. 3ª is a detail plan view of a part shown in Fig. 3;

Fig. 4 is a detail elevation corresponding to Fig. 3, showing the traversing mechanism and the support for a winding container;

Fig. 5 is a detail section in elevation of one form of tension and detector mechanism;

Fig. 6 is an enlarged detail of a part shown in Fig. 5;

Fig. 7 is a plan corresponding to Fig. 6;

Figs. 8 and 9 are detail plans partly in horizontal section on the line 8—8 of Fig. 17, showing different positions of the winding spindle carriage;

Fig. 10 is an underplan of a part shown in Fig. 9;

Fig. 11 is a detail vertical section corresponding to Fig. 5, illustrating a modified form of yarn tension and slub catching device;

Fig. 12 is a view corresponding to Fig. 11, showing the parts in a different position;

Fig. 13 is a plan of certain parts shown in Fig. 11;

Fig. 14 is a detail elevation illustrating the bobbin gate at the lower end of the unwinding holder;

Fig. 15 is a similar view showing the bobbin gate opened for discharge of an exhaust bobbin;

Figs. 16, 17, 18 and 19 are elevations on a transverse plane, showing different positions of devices relied upon for lifting the winding spindle and winding package;

Fig. 20 is a detail plan and

Figure 42:
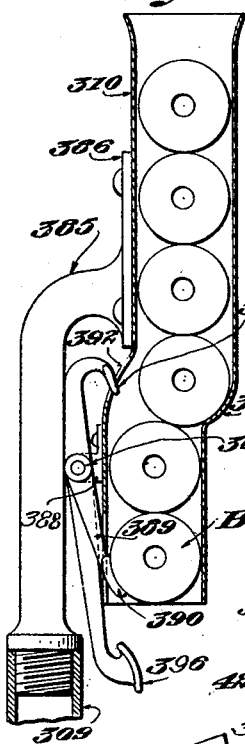
Figure 43:
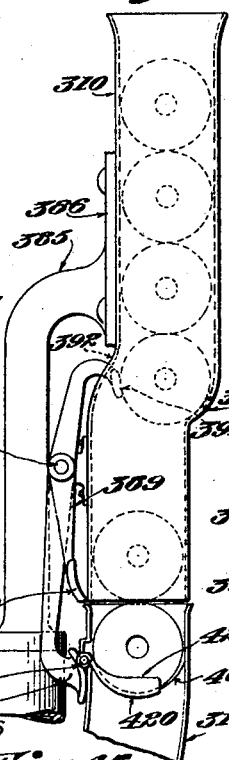
Figure 44:
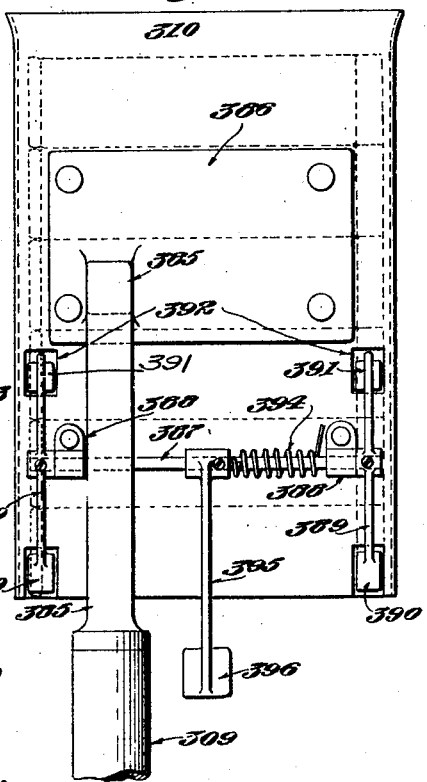
Figure 45:
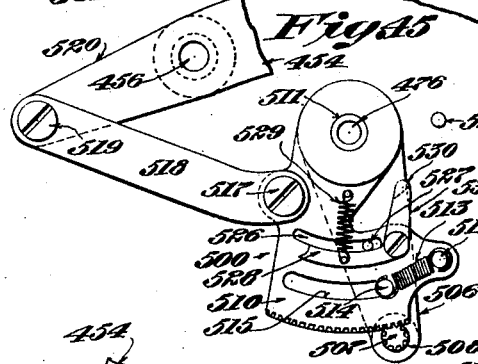
Figure 46:
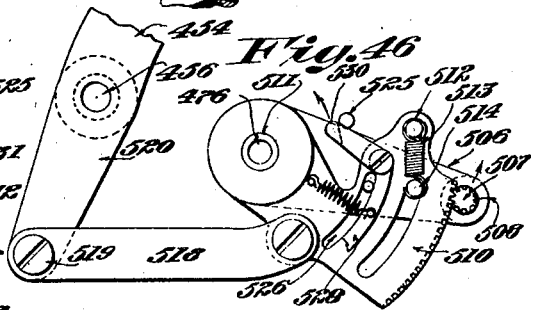
Figure 47:
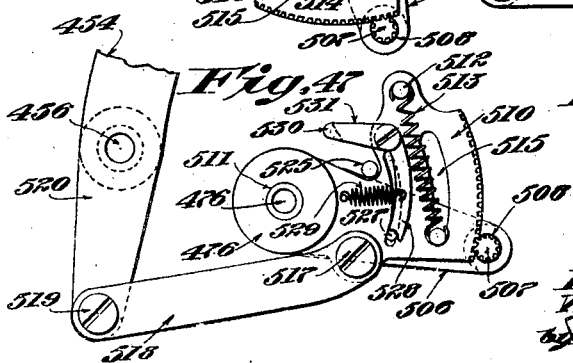
Figure 48:
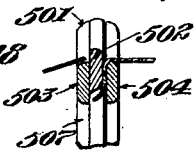

Fig. 21 is a detailed side elevation of full-cheese doffing and new tube or core donning mechanism;

Fig. 22 [Sheet 1] is an elevation is an elevation of an actuating cam for the doffing slide;

Fig. 23 is a detail elevation on an enlarged scale and partly in vertical section of the tube donning mechanism;

Fig. 24 is a vertical section on the line 24—24 of Fig. 23;

Fig. 25 is a detail section on the line 25—25 of Fig. 24;

Fig. 26 is a detail plan partly in section on line 26—26 of Fig. 2, showing parts of the reciprocating mounting for and certain driving connections for the replenishing mechanism;

Fig. 27 is a detail vertical section of certain driving gears;

Fig. 28 is an enlarged detail in plan including the parts shown in Figs. 27 and 30;

Fig. 29 is an enlarged plan view of a pawl mechanism shown in Fig. 26;

Fig. 30 is an enlarged detail side elevation of the replenishing mechanism;

Fig. 31 is an end elevation showing one operative relation of the replenishing mechanism of Fig. 30 and a supply bobbin magazine;

Fig. 32 is a right side elevation of certain operating connections shown in Fig. 31;

Fig. 33 is a detail left side elevation of an operating cam for replenishment bobbin rotating means;

Figs. 34, 35 and 36 are plans respectively illustrating different positions of supply bobbin and winding package core or tube end-finding and knot-tying devices of the replenishing mechanism;

Fig. 37 is a detail section of supply bobbin presenting devices;

Figs. 38, 39 and 40 are side elevations corresponding respectively to Figs. 34, 35 and 36;

Fig. 41 is a side elevation illustrating a later stage of the tying operation;

Fig. 42 is a vertical detail section of one form of bobbin magazine;

Fig. 43 is a side elevation corresponding to Fig. 42;

Fig. 44 is an end elevation of parts shown in Figs. 42 and 43;

Figs. 45, 46 and 47 are rear side elevations of the knotter positioning and actuator devices;

Fig. 48 is an enlarged plan view of a knotter tying-bill; and

Figure 49:
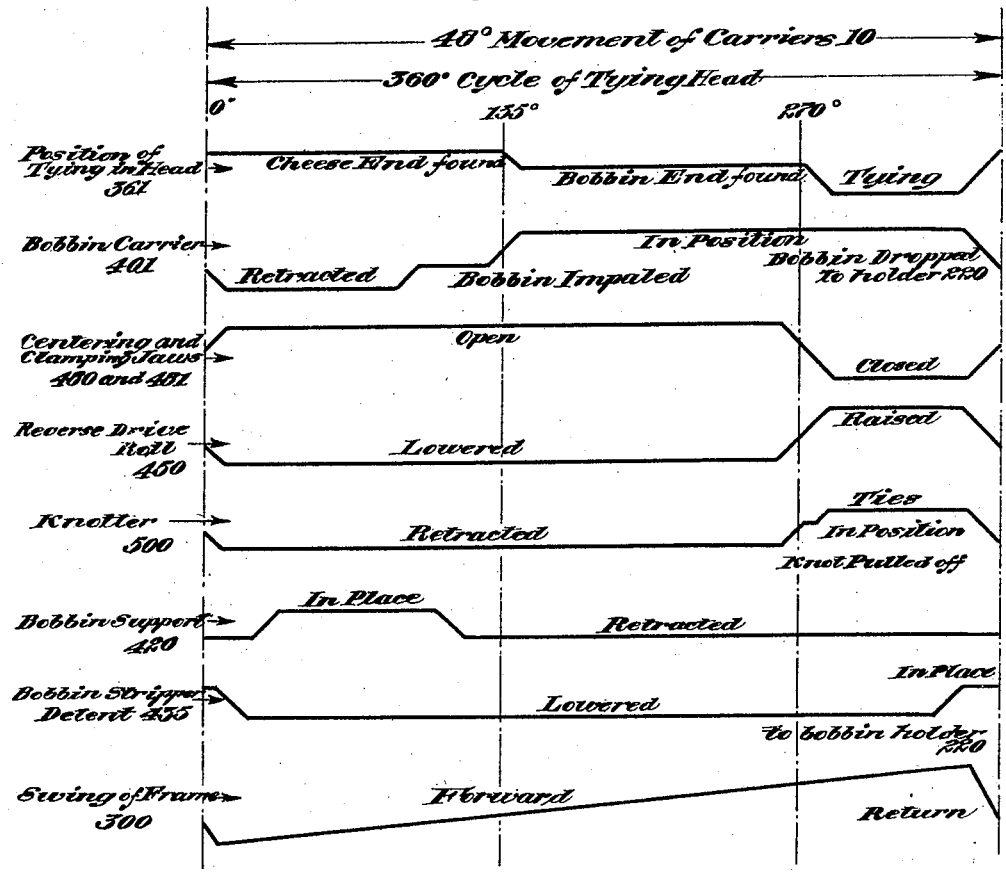

Fig. 49 is a chart relating the times of actuation of the replenishing devices.

A common defect of winding machines in general use resides in the necessity for circulation about the machine of the operator, whose duty it is to replenish the winding packages and to remove the wound packages when finished.

Attendance upon such a machine involves carrying about the machine of heavy weights of fresh supplies of yarn and also involves delay in operation due to the necessity for providing at each winding pair [thereby meaning the unit of unwinding bobbin or package, winding package, supports for these, traverse means, guides and tensions for the winding yarn] means for stopping the operation either upon exhaustion of the yarn being wound or completion of the wound mass, until such time as the circulating operator of the machine can finish replenishing and piecing the supplies at the intervening stopped units and removing all of the intervening and stopped finished packages. This is wasteful of time and attendance and exhausting to the operators, and inefficient in respect to the considerable idle time of winding pairs, lessening the full capacity of the machine, and causing the output of the machine to depend upon the activity and skill of the operators.

In the said application of Edward J. Abbott, Serial No. 429,695 (Patent No. 1,609,639, December 7, 1926) it has been disclosed how to cause the winding pairs comprising a supply bobbin, a traverse mechanism, and a winding package in the form of a headless ball or cheese to progress about the machine so as to bring each winding pair at or about the time of completion of winding from the supply package to the relatively fixed station of an operator at one end of the machine. For these purposes the machine of the said application comprises among other things tractor rolls for driving the winding package along which the winding pairs are progressed during winding; a support for bobbins being unwound holding the bobbins in an erect position for unwinding from one end of the supply package; and a traverse guide and means for operating it causing rapid reciprocation of the traverse guide in the direction of progress of the winding package or cheese along the tractor rolls. In the machine of the said application the operations of replenishing the supply packages, doffing the full cheeses, donning cores, quills or tubes for a new winding for another cheese, and uniting operations for joining the leading end of a supply package to the following end of a winding package are manual operations adapted to be performed by the skilled operator at one end of the machine.

The present invention retains the advantageous mode of operation and construction of the machine of the said application in respect to the arrangement of tractor rolls, the direction and mode of progress of the winding pairs first in one direction along one tractor roll and then in another direction along another tractor roll, and retains in general the driving and gear connections for these purposes.

The present machine provides for the automatic detection of exhaustion or breakage of the supply yarn or of slubs not desirably to be wound into the winding package; provides automatic means for detecting and delivering or doffing the full cheeses; provides automatic means for placing on the winding spindles of the winding pairs a new carrier, core, tube or quill; provides for automatically beginning winding on the new carrier or core for a newly begun package or cheese by automatically delivering the spent bobbin or carrier for the unwinding supply; provides for automatically replenishing in respect to the winding carrier and spent supply by providing and positioning a new supply by automatically uniting the leading end of the new supply to the following end of a broken or exhausted supply or to a starting winding on the winding package carrier; and further provides for accomplishing these operations at one end of a circulating winding machine having the advantages of the machine of the said Edward J. Abbott application, by accomplishing the circulation about the machine of winding pairs in about the time required to wind all of the yarn off of one supply package onto the forming cheese, so that in normal operation the unwinding carriers are exhausted when they reach the replenishing mechanism.

In a preferred form the machine, referring now to Figs. 1 and 2 of the drawings, comprises end frames 1 and intermediate frames 2 in any desired number shown as castings, see Fig. 3, having suitable seats for upper longitudinal rails 5, 5. Other longitudinal struts may, if desired, be provided, for instance as shown at 6, to increase the strength and rigidity of the framework, which may be of any suitable form for supporting the working parts. A sufficient number of frames 2 is provided to build a machine of the desired length, and this length may be dictated by the length of the unbroken yarn on the usual unwinding packages, the speed of circulation of the winding pairs, and the linear speed of winding on the winding package, as further referred to below. Whether or not the frames 1 are provided with sufficient longitudinal struts to stand alone without aid from the rails 4 and 5, these rails are bent, for example at $4^a$, $5^a$, in semi-circular curves about centers at the respective ends of the machine. The rails 4 and 5 therefore provide vertically spaced endless tracks for the winding and unwinding pair carriers 10.

*The circulating carriers.*—Preferably the carriers 10 are constructed as best shown in Figs. 1, 2, 3, and 4 as substantially upright T-section frames 11 having grooved lugs at their lower ends at 12 straddling the rail 5; having an upper bearing frame construction having spaced ends 13, and a central downwardly extending lug 14 bolted to the upper end of the frame 11, the frame 13, 13 having rearwardly extending bifurcated legs 15 providing a bearing for anti-friction rolls 16 resting on rail 4, and said frame 13 carrying at one end an upwardly extending arm 17 backwardly curved, terminating in a boss 18 on which is erected an upright slide shaft 19 bearing a key or gib 20 and having mounted at the upper end thereof a cap 21 serving as a bearing place for certain members presently mentioned.

The frames 13 may further carry antifriction rolls 22 and 23 respectively taking against the rear and front faces of the rail 4. The carriers 10 are circulated about the straight sides and semi-circular ends of the rails 4 and 5 by any suitable driving connection to an endless chain 30 running substantially parallel to, within and near the rail 4; for example links 25, Fig. 1, are pivoted respectively to the lugs 15 at the rear side of the frames 13 and to projections from appropriate links in chain 30, so that the points of attachment of the chain 30 may be shifted to different distances from the rail 4 during motion of the carriers 10 around the ends of the machine.

*Driving connections.*—Any suitable means for driving the chain 30 at the desired speed may be employed. Preferred means illustrated in the drawings comprise sprocket wheels 35 and 36 at the respective ends of the machine respectively mounted on vertical shafts 37 and 38. Shaft 37 may be fixed in a bearing 39 which, if desired, may be longitudinally adjustable in respect to the frame 1, for example by means (not shown) of the said application for patent. Shaft 38 may be similarly mounted in the bearing block 40 on the right hand end frame 1, but this shaft is keyed to the sprocket 36 and suitably driven to move the chain 30. The vertical shaft 38 is driven as presently described.

Referring to Figs. 1, 1ª, 2, 3, and 4, the winding package is driven by driving contact with one or the other of the longitudinal tractor rolls 50, 51 which preferably extend along the machine above the rails 4 between end bearings in brackets 52, 52 at the rear end of the machine and end bearing brackets 53, 53 formed as a part of a hollow transverse gear casing 55 extending across the front end of the machine inward of the right end bearing frame, Fig. 1.

Casing 55 has appropriate bearings for like short shafts 56 and 60 (of which shaft 56 may be employed as a main driving shaft, bearing for this purpose a pulley 57 driven by a belt 58 from an overhead clutch pulley, (not shown) and for this purpose the casing may be rigidly bolted to longitudinal struts extending between the end frame 1 and the adjacent frame 2. Within the casing 55 shafts 56 and 60 are gearing together as shown in diagram in Fig. 1ª by like gears 62, 63 in turn meshing with idler pinions 64 and 65 on stud shafts 66, 67 within the gear casing 55. Idler pinions 64 and 65 in turn mesh with the drive pinions 68 and 69 formed on or attached to the ends of the respective tractor rolls 50, 51. When the shaft 56 is driven the tractor rolls are driven at like relatively high speeds in opposite directions, so that their upper surfaces rotate inwardly toward the machine. The primary drive may of course be applied instead to any element of these connected rotary parts.

At suitable intervals in the length of the rolls 50, 51, these rolls may be supported by uncapped bearings on brackets forming part of the frames 2, with the effect that the upper surface of the rolls 50 or 51 is free to support and drive a winding ball or cheese carried by a winding spindle 26 projecting at right angles from a boss at the bottom of a hollow slide 27, Figs. 3 and 4.

The shaft 60 may carry a pulley 70 driving a belt 71, in turn driving a pulley 72 on a longitudinal shaft 73 in bearings in the frames 1 and 2. One end of the shaft 73 carries a pinion 74, Figs. 1 and 2, engaging a much larger gear 75 having attached to one face a cam 76 presently referred to, and fast upon a primary cam shaft 77 geared at 78, 78 to a secondary cam shaft 79, all in bearings in the frames 2. The left or back end of the shaft 79 carries a tappet cam 80 for use presently mentioned. The right or front end of the shaft 77 carries a tappet cam 81 for use presently mentioned.

The right hand end of the longitudinal shaft 73, see Fig. 30, finds a bearing in the casing 85 containing a thrust bearing at 86. Integral with or attached to the shaft 73 within the casing 85 is a suitable driving worm 87 for a worm gear 88 keyed to the shaft 38. The shaft 73, its worm, and the gear 88 thereby drive the shaft 38 and the chain 30. Certain other parts are actuated from the shaft 38 as presently mentioned.

It will be observed, from the operation of the machine so far as described, that there is constant actuation of the tractor rolls 50, 51 which may be driven at speeds exceeding 1200 revolutions per minute, and that the rotation of these tractor rolls is related to the motion of translation imparted to the winding packages and the unwinding packages carried by the carriers 10. The carriers 10 may move, for example, at the rate of ten feet per minute.

It is desirable to so operate upon the winding package carried by the carriers 10 as to cease actuation during the progress around the ends of the machine of these carriers and the load carried by them. It is desirable also to cease actuation of the traverse motion by which the unwinding yarn is laid upon the surface of the cheese or other packages driven by the tractor rolls 50, 51.

Referring now to Figs. 1, 2, 3, and 4, devices are provided for consecutively lifting the hollow slides 27 carrying the winding spindles 26 as they are about to pass off of the respective tractor rolls 50, 51. On a frame 2 near the front of the machine as shown in Fig. 3 a slideway 90 is erected to receive a slide 91 connected by a link 92 to a lever 93 pivoted at 94 to the opposite side of the frame 2. The lever 93 lies over the tappet cam 81 at this end of the machine, and the relation of motion of the shaft 77 to the motion of the chain 30 is such as to lift the slide 91 at each passage by it of the vertical slide shaft 19 of each of the carriers 10. The hollow slides 27 are each provided with an anti-friction roller 95 on a stud 96 to engage a T-head 97 on a bell crank lever 98, 99 pivoted at 100 for limited motion in respect to slide 91. A relatively weak spring 101 normally supports the lever 98 at the top of its limited motion. Mounted on the slide 91 (see also Figs. 16, 17, 18 and 19) is a latch lever 102 pivoted at 103 for control by a leaf spring 103ª mounted on an indicator 104 on the pivot 103.

When the anti-friction roll is in a low position such as shown in Fig. 3 upward motion of slide 91 will cause the T-head 97 on lever 98 to be depressed in relation to the slide 91, the lever 102 and spring 103ª being free to drop to the position shown in Fig. 3. Under these circumstances the lifting motion of the slide 91 is sufficient to carry the hollow slide 27 to a height to engage a lug 28 of said slide behind a bell-crank latch lever 105 mounted on the head 21 of each vertical slide shaft 19.

The slideway 90 carries a vertically adjustable cam 106 adapted to move the lever 102 and latch the depending arm 99 of the lever 98, 99 so that the slight freedom of motion permitted against the spring 101 may not take place on encounter of the crutch head 97 with the anti-friction roll 95. But this will not take place unless the anti-friction roll 95 is in a relatively elevated position, see Fig. 16, as will occur when the cheese C being wound is of a predetermined diameter or a greater diameter. In that case the cam 106 will have latched the arm 99 of the lever 98, 99 before the roll 95, the height of which measures a radius of the wound cheese, is reached, and as a result of this the hollow slide 27 will be lifted a measured distance further than is necessary merely to latch the lug 28 by the latch lever 105.

Projecting inwardly from the hollow slide 27 a stud 29 is provided to engage with a depending cam 107 mounted in a slot in the cap 21 whenever the hollow slide 27 is lifted abnormally by locking the lever 98, 99 in its upper position.

The key 20 in the keyway on the hollow slide 27 ends in a position to permit movement induced by the stud 29 on the cam 107 whenever this abnormal lifting motion takes place. As a consequence of this arrangement, whenever there is a full cheese on the spindle 26 at the time of passage from the roll 50 and before the carriers 10 move around the front end of the machine, the hollow slide 27, the spindle and the full cheese will be turned about one slide shaft 19 to the position best shown in Fig. 1 at an angle of about 30° to normal position. This brings the full cheese within the influence of doffing or discharging means, and positions the spindle 26 to receive a new carrier or tube for another winding package.

*The traversing mechanism.*—The frame 13 of the carrier 10 for the winding and unwinding pairs is provided with means for guiding the yarn in the quick-pitched or steep spirals desirable to build up a headless wound package, such as the well-known Fiji package mentioned above, in which the heads or ends of the ball or cheese are relatively perpendicular to the winding axis and comprised of the cusps or reversals of the spires of the winding in each layer. For these purposes, preferred devices shown in the drawings comprise a rotary traverse cam made as a barrel cam 115, Figs. 2, 3 and 4, having an endless cam path 116 of the desired number of turns and having projecting end journals 117 having their bearings in slots 118 in the frames 13, and provided with bearing blocks 119 movable inwardly in the slots under the influence of springs 120. The cam 115 is provided with tractor rings 121, which may be soft metal rings fast on each end of the barrel cam and projecting slightly above its general surface. These rings are normally forced by the springs 120 into contact with the rolls 50 and 51 to be driven thereby.

Parallel with the axis of the rolls 50, 51 when the device is in use and with the axis of rotation of the cam 115 the frames 13 also carry guide bars 122, 123 and straddling these two parallel guides a block 124 bored for the guide 123 and slotted for the guide 122 carries a depending pivoted follower 125 and an upwardly projecting cam-edged lug 126 having a central guiding slot for the yarn. On the outer face of the frames 113 in suitable lugs the polished guide bar 127 provides an out-board support for yarns going to the winding surface from the supply.

The arrangement is such that the rapidly reciprocating guide 126 projects into the path of the yarn guided by the guide 127 and the upper surface of one of the tractor rolls 50, 51, and by reason of the cam edges of the guide 126 picks up and reciprocates the yarn in a direction parallel to the winding axis.

It is desirable to remove the contact rings 122 from driving contact with the rolls 50 at times when the hollow slide 27 is lifted. For this purpose the frames 13 may carry a rock shaft 130 having a depending lever 131 adapted to be latched in an outward position by a gravity latch 132 pivoted at 133 in a part of the frame 13. Eccentrically disposed arms 135 at the ends of the rock shaft 130 take under the lower ends of vertical slide wedges 136 in ways in frame 13, so that when the lever 131 is rocked inwardly with shaft 130 the cam 115' is axially moved outward, the driving sleeves 121 are forced out of contact with the rolls 50 or 51.

On the rails 4 at appropriate places near the ends of the tractor rolls 50, 51 in the direction of motion of the carriers 10 suitable cams 138 lift the lever 131 to the outward position. Suitable cams 139, see Fig. 2, on the rail 4 may be provided to lift the latch 132 to release the lever 131 and permit the wedges 136 to drop and thus to restore the parts to operation. Cams 138 and 139, not shown, may be placed on the run of the track 4 at the ends of roll 51, for the same purpose.

Referring now to Figs. 1 and 2, means are provided to drop the slides 27 so as to bring the winding package onto the tractor rolls 50, 51 at the beginning of their passage along either of the tractor rolls. Preferred means for this purpose comprises standards 140, 140 having at their upper ends forwardly projecting cams 141 which act with the cam tails 142 of the latch levers 105 mounted at the heads of the respective slide shaft 19.

The standard 140 may also carry a friction spring 143 adapted to engage a core or partly wound cheese above its axis to insure that the tube is thrust as far as it will go on spindle 26 and to set the cheese rotating on its spindle before it is dropped on the roll 50 or 51.

*Doffing and winding-package core donning mechanism.*—Referring now to Figs. 1 to 4 and 16 to 25 inclusive, whenever a full cheese has been abnormally lifted by the operation of the slide 91 and lever 98, and when the cam 107 and stud 29 have cooperated to turn the hollow spindle carriage 27 outwardly, as above explained, the parts are held in this position, as by the V-shaped upper end of the key 20 taking into a V-slot 140, Fig. 10, on the under face of the slide 27, the slide 27, spindle 26 and its carried package continuing to travel with chain 30 toward and beyond the position shown in Fig. 1, and at a higher level than any operative position of the spindle 26 and slide 27.

In this position the full cheese passes, by continued travel with chain 30, the place of operation of devices adapted to remove the cheese and its tubular core endwise from the spindle, and to place a new core on the spindle. Any effective means for this purpose may be resorted to, but in a preferred form the machine is provided with an auxiliary bridge frame having a horizontal member 145 and a vertical member 146 erected on one of the frames 2 and its outer end supported by a floor standard 150, which standard may carry a magazine 148 and feeding mechanism for whatever kind of tubular carrier or core upon which it may be desired to wind the wound product of the machine; for example, as shown, these carrier cores may be wooden or molded-composition cylindrical tubes 147 having flared-end central bores and preferably carrying a short pre-winding of any suitable yarn at 149 to facilitate automatic starting of winding by automatically uniting to the pre-winding the leading end of a new yarn supply. Preferably the magazine 148 loosely supports a vertical column of cores 147 and is adapted to permit the bottommost core to be removed endwise by core-donning mechanism also carried by standard 150 and presently to be explained; but any suitable magazine and feed may be resorted to within some expressions of this invention.

Member 145 of the bridge frame is longitudinally grooved at 151 to receive a reciprocating connector 152 continued by a rack 153 in a slot in vertical member 146, meshing with a pinion 154 fast on a short shaft 155 in bores in a lug of member 146 and in a bore in a rack guide 156 which may be fastened to or form a part of member 146, shaft 155 carrying a pinion 157 meshing with a vertical rack 158 on a twisted bar 159 bearing at its lower end an anti-friction roll 160 adapted to take into the cam path 161 of the cam 76, Figs. 1, 2 and 22.

The connector 152 carries a depending pusher 162 adapted to strike and move to the right of Figs. 21 and 22 the full cheeses on the reciprocal stroke to the right of pusher 162, as given in time with the motion of chain 30 by the cam 76, 161 and the rack and pinion connection 159, 153, etc. The cam track 161 is relatively steep, so that the motion of the pusher 162 is rapid in relation to travel of the chain 30 and the wound cheeses in the direction of the arrow a, Figs. 1 and 20. The slope of the direction of motion of the pusher 162 in relation to the proper motion of the travelling wound cheese is such as to minimize shock of contact and to result in slightly rotating the doffed wound mass and its core on its spindle 26 to aid doffing; preferably doffing is completed and the full cheese dropped before the axis of spindle 26 reaches the plane of the replenishment cores in magazine 148.

The full cheese doffed by the pusher 162 as soon as released from spindle 26 drops into a gravity chute 175 leading to an enclosed conveyor 176, which may deliver wound cheeses at any desired point.

The doffed cheese is preferably caused automatically to initiate replenishment of a new winding carrier or core 147, in order to insure discharge of the full cheese, for example by tripping in its fall a trigger 180 controlling the operation of motor-actuated core feeding means cooperating with the supply of cores or carriers in magazine 148. Referring to Figs. 21 to 25, the core feeding means may comprise a spring motor having a spring drum 185 and attached pinion 193 fast to the outer end of a spiral spring 186 fast at its inner convolution to the horizontal headed stud shaft 187 mounted in a bored boss of a motor casing 188 attached to or forming a part of the magazine 148. Shaft 187 also carries a winding gear 189 meshing with a rack 190, Figs. 21 and 24, attached to the connector 152; gear 189 carries a spring pawl 191 adapted to take into a notch 192 in drum 185 on a stroke to the right of rack 190, and rotate drum 185 and pinion 193 clockwise as viewed in Fig. 23. Pivoted at 194 in casing 188 a driver lever 195 is provided with a rack segment 196 meshing with gear 193, and at its lower end with a slot embracing an anti-friction roll 197 on a cranked connector arm 198 extending through a slot 199 common to magazine 148 and casing 188 into a hole in a driver 200, which may be a hollow steel cylinder sliding in a tubular extension 201 of magazine 148. Driver 200 moves to the right of Fig. 23 on motion to the right of rack 190, and in this position a lug 202 of trigger 180, which is pivoted at 203 to casing 188, enters a hole in extension 201 and locks against the left face of driver 200. Trigger 180 is lifted for this purpose by an arm 204, Fig. 24, taking into a hole in the bottom of a pawl lifter 205 in vertical bores in lugs 206, 206 of casing 188 and held upward by spring 207. When the lug 202 of trigger 180 has engaged in front of driver 200, pawl lifter 205 is positioned to strike the tail of pawl 191, to release drum 185 while gear 189 moves with rack 190 on its left-hand stroke, which begins immediately. But rotation of the pinion 193 and drum 185 by spring 186 is restrained by the trigger 180 acting through driver 200, lever 195 and segment 196, until a full cheese depresses trigger 180.

Motion of driver 200 to the right has now permitted a core 147 to fall to the bottom of its magazine in line with driver 200, and pressing trigger 180 causes the described spring motor acting through lever 195 and driver 200 forcibly to project the waiting core to the left of Fig. 21 and cause it to take over the spindle 26, at that time in alignment with its central bore.

The spindle 26 and new core 147 are now restored to axial alignment with the circulatory path of travel. The bridge-frame member 145 or some other fixed part of the frame of the machine may support a wiper 165, Figs. 8, 9 and 20, preferably a stiff depending plate spring mounted on a bracket 166 in the path of the roller 96 on the lifted carriage 27, and thus adapted to rotate the carriage 27 to bring the key 20 in line with its keyway, whereupon the carriage 20 drops free of wiper 165 and so far as the lug 28 and latch 105 will permit. The axis of spindle 26 is thus also restored to the vertical plane of the axis of tractor roll 50, which is one of its normal positions, ready to begin winding when lowered onto the roll 51, after replenishment of the unwinding supply.

*The unwinding supply devices.*—Referring to Figs. 1, 2, 3, 5 to 7, 14, 15, and 30, ordinary use of the machine of this invention results in winding on the winding package the normal length of one supply package of yarn, usually a spinning bobbin, in one whole traverse of the carriers 10 along roll 51 and roll 50. The supply packages are therefore normally exhausted when they approach the right end of their circulatory path of motion as viewed in Figs. 1 and 2, and the usual operation includes automatically removing the spent bobbins. It is better practice also to remove and replace with full bobbins, supply bobbins partially empty by reason of breakage, and to recover these from the spent bobbins for rewinding to full condition. The machine therefore includes on each of the carriers 10 suitable supply bobbin holders and adjunctive means adapted to discharge spent or partially spent bobbins and replace them with others at the right end of the machine, as viewed in Figs. 1 and 2.

The carriers 10 are therefore provided with gravity charge and discharge devices, and with supports for the unwinding bobbins, hereinafter generically referred to as unwinding holders. In the preferred form, referring now to Figs. 3, 14, 15 and 30 particularly, these instruments may be made in the form of conical sleeves open at both ends, with the larger end up as shown at 220 mounted in an erect position in any suitable way on the lower interior surface of the carriers 10; for example electrically welded or soldered lugs 221 on unwinding holders 220 may be screwed or bolted to the channel 11.

On the lower end of the channel 11 opposite the bifurcated guide lug 12 a gravity gate 222 eccentrically pivoted at 223 and comprising a horizontal stop 224 and a limit stop pin 225 may be provided. The interior diameter of the unwinding holders 220 is such that the unwinding package or bobbin B may rest freely on the portion 224 of the gate in such a position as to stand by gravity and to impose no obstruction to unwinding over the upper end of the bobbin or other package B.

The machine is so arranged as to discharge spent bobbins B by gravity. At an appropriate place on the rail 5 following a place at which in the normal operation the bobbins B may be completely unwound, the rail 5 may be equipped within an appropriate detent 226 against which the member 224 of the gate 223 takes upon the motion of the carriers 10 past its position, this as best shown in Figs 14 and 15. This swings the gate member against gravity and drops the bobbins. The spent bobbins may be received, see Figs. 1 and 2, in a gravity chute 227 leading to the belt conveyor 228 adapted to deliver the spent bobbins wherever desired. As best shown in Fig. 2, the gate opener detent 226 may operate at a point following the operation of the cheese-lifting devices 97 at the following end of the traverse along the roll 50, and the delivery of the spent bobbins may take place just prior to the operation of the full-cheese doffing devices above described.

*Tension devices, exhaustion, braking, and slub detecting mechanism; winding package stop motion.*—Bearing in mind that it is intended to place new bobbins in the unwinding holders 220 to replace the exhausted or otherwise discharged bobbins, it is desirable to provide devices for tension and stop motion detector purposes adapted to be rethreaded and reset either upon the mere appearance and passage through them of the replenishment supply, or by timely operation as a consequence of the progress of the carriers 10.

One form of device for this purpose is illustrated in Figs. 3, 5, 6, 7. Axially in alignment with unwinding holders 220 of each carrier 10 the depending channel 11 carries a directing support 230, which may be a conical sleeve like the holder 220 mounted at 231 in a similar way and having its larger end upward. As presently to be described, replenishment bobbins may be dropped through the directing support 230 from a communicating chute, and it is desirable that the mere passage of a bobbin to the unwinding holder 220, the unwinding end being detained aloft, may perform all of the operations necessary to thread the unwinding end through tension and detector devices. For one example of such devices, on directing support 230 may be soldered or otherwise fastened a bent wire 232 providing a horizontal pivot at 233 for a coil 234 of a corkscrew guide, tension and slub catcher lever 235, upon which a light counterweight 236 may tend to keep the depending spiral 237 and the vertical post 238 and a bent end 239 in an upper operative position in which the post 238 is axially disposed in the directing support 230. The bent portion 239 may terminate in an eye 240 in which and in a hole in a light steel slub-catching plate 241, a binding bolt 242 may take to mount the slub-catching plate 241 in the relation best illustrated in Figs. 6 and 7. As shown in Fig. 5, the bobbin B falling through the directing support 230 strikes and moves out of the way the portions 239, 237, 241 of the lever 235, but after passage of the bobbin these parts are restored to normal operative position by weight 236. Upon attempting to unwind the bobbin, now in the holder 220, the ballooning rotation of the yarn wraps the yarn through the spires of the spiral 237 to the final position indicated in Fig. 6, in which it will be observed that the final run of the yarn around the tensioning portion 238 passes between the slub-catching plate 241 and the horizontal arm 239.

The wrapping of yarns about the portion 238 provides a normal tension for the unwinding yarn. If, for any reason, the tension should become abnormal, or if a slub should pass between the plate 241 and the arm 239, there will be an upward stress upon the lever 235.

Normally this stress is resisted by the bent end 245 of a light bell crank lever having a sleeve pivoted on the wire 233 and connected by link 246 to a bell crank lever 247 pivoted on the rear face of the directing support 230. Lever 247 is bored for a detent at the end of a link 248 extending upwardly to the lever 249, (see Fig. 4 also) pivoted on the boss 18 of the frame 13 and having one end taking under a bent trigger lever 250 pivoted on the rear face of a bracket 252, and adapted to move against a light spring 251. Bracket 252 supports a short rigid pivot shaft 253, in turn supporting a stop lever 255 terminating in a segmental winding package lifting brake and shield 257, which may extend parallel with spindle 26 for a sufficient distance.

A relatively strong spring 258 tends to throw the lever 255 to a position to insert the segmental shield 257 between the winding package and the traveling roll 50. This tendency is resisted by the trigger lever 250, which bears just above a notch in lever 255, until a pull on link 248 releases the trigger lever. It will be obvious that any abnormal stress on the bent end 245 due to the occurence of a slub or abnormal tension will release the stop lever 253 and shield 257 to lift and brake the winding package to cease winding.

The same devices may be utilized for stopping winding and braking rotating of the winding package on exhaustion or breakage of the unwinding yarn. Referring to Fig. 3, in a vertical slot in the rear face of the bottom end of the unwinding holder 220 a wire lever 260 pivoted at 261 between the lugs 221 is normally held to the left of Fig. 3 at its upper end by the bottom of the replenishment bobbin B. The upper end of the lever 260, see Fig. 3ª, rests near a bend 262 in a bent wire detector arm 263 integral with a light rock shaft 264 held by suitable staple rivets to move on the front face of the channel 11, and having at its upper end a fork 265 taking over the link 246. A light spring 267 tends to pull detector arm 263 toward the observer in Fig. 3, but this motion is restrained normally by the run of yarn Y extending from the unwinding holder 220 through the directing support 230. But when the bobbin has been discharged from the unwinding holder 220, light spring 268 surrounding pivot 261 causes the lever 260 to react with the lug 262 on the arm 263 to remove the arm 263 out of the way of an incoming bobbin. The detector arm 263 is released to bear on the yarn after a new supply has been put into the unwinding holder 220 by displacement of lever 260 by the bobbin butt.

Other forms of automatically rethreading tensioning devices, slub detectors, breakage and exhaustion detectors and tensioning devices may, of course, be substituted for the described devices. For example, referring now to Figs. 11, 12 and 13, the directing support 230 may be provided with wire pivots 270 on opposite sides of the directing support, and upon these and working through vertical slots in the support 230 there may be provided pairs of symmetrical two-part levers 271 and 272, preferably provided with attached wire tension elements 273, 274, which may comprise electrically welded U-staples conjoining forks, which forks may terminate as shown in Fig. 13 in guide ends 275, 275 extending beyond the space defined by the bottom end of the directing support 230. Attached to the upper surface of the tension levers 271, 272, respectively, there may be provided chisel-edged slub-catching plates 276, preferably one of shorter radius to its pivot 270 than the other.

The outward ends of the tension levers 271, 272, are respectively provided with counterweights 277. Upon dropping a full bobbin through the device, the impact of the bobbin butt is received by the slub-catching plates 276 and the device opens to pass the incoming bobbin, as shown in Fig. 12, and thereafter closes against the yarn. Upon occurrence of a slub the chisel-edged plates 226 upon encounter with the slub move against and nip the yarn. There is freedom of motion for the grid elements 273, 274 to approach each other more closely than at normal running position, and this slight motion is utilized to stop winding through the agency of one of the counterweights 277, a wire lever 280 pivoted on a wire arm 281 and connected by link 282 to a lever 283 bearing on the link connection 248 to the winding package stop motion above described.

If the yarn should break or exhaust below the grids 273, 274, the grids also approach each other and work the lever 280 to actuate the stop motion through the link 248.

*Unwinding package replenishing devices.*—It will be understood that in the operation of the machine so far as described, each of the cheeses being wound on a carrier on the spindle 26 normally receives an accretion represented by the length of the yarn on one supply bobbin during one circulation counterclockwise about the machine, as shown in Fig. 1. Depending on the size of a normal supply package the completed cheese will necessarily contain many lengths represented by the contents of one supply package, and one of the objects of this invention is to enable the machine automatically to go on winding from a replenishment supply automatically united to the spent end of the yarn of the last bobbin wound on a cheese.

It is therefore preferred to provide the machine with devices adapted to deliver a fresh bobbin into the unwinding holders 220 at passage by the right-hand end of the machine as shown in Fig. 1; to detain the leading end of the fresh supply; to find the following end of the exhausted supply extending from the partially wound cheese, to bring these two ends together and unite them, preferably by tying them together; and to do this during the time when the carriers 10 are passing around the end of the machine between the right-hand end of the tractor roll 50 and the right-hand end of the tractor roll 51. It has been explained above how a full cheese is doffed and a replenishment core placed upon the winding spindle. But many of the winding spindles are not elevated to doff their cheeses because the automatic devices above described for discovering a full cheese by measuring its diameter can not operate unless the cheese is full, and therefore the new cores and partially wound cheeses on the spindles 26 of the carriers 10 will come around the end of the machine in normal position, lifted only sufficiently far to cause the latch lever 105 to hold the slide 27 in intermediate elevated position.

It is therefore provided that any newly placed core or partially wound cheese passing around the end of the machine in this position may meet and travel with a movable element of replenishment devices adapted to travel with the carriers 10 through a sufficient reciprocal arc and then to return to deal with the following partially wound cheese. These replenishment devices may and preferably do comprise devices for feeding full new bobbins from the bobbin supply mechanism; devices for finding and detaining the leading end from these bobbins; devices for finding the end on the partly wound cheese, and devices for assembling and tying together these two ends; and finally, devices for delivering the tied-in replenishment bobbin through the directing support 230 into the unwinding holders 220. Thereafter the prepared unwinding and winding pairs go into operation by letting down the winding spindle 26 to contact with the roll 51, and by resetting the stop motion devices mentioned above.

But it will be understood that the machine will operate satisfactorily without the stop motion devices described and especially in such cases as when it is intended to inspect the yarn on the wound cheeses for slubs before using it, and the stop motion devices may then be dispensed with to no disadvantage except such as may follow from idle winding at pairs where the yarn has broken and from having to recover from among the spent bobbins partially unwound bobbins. In part, the capacity to do without slub catchers and stop motion means in such cases may be attributed to capacity of the replenishment and uniting mechanism to be described to deal with new cores and partially wound cheeses in any state of completion.

Referring now especially to Figs. 2 and 26 to 48, inclusive, and referring first to Figs. 26 to 30, the lower end of the drive shaft 38 for the chain 30 is utilized to support an oscillating frame 300 (Fig. 30), preferably made as a light bifurcated casting having a lower bearing boss 301 and upper bearing boss 302 bored to receive the shaft 38. Frame 300 is thereby adapted to sweep an angular arc about the shaft 38 as a center, at least of the magnitude between two successive carriers 10. The outer end of the frame 300 carries an erect housing 305, in and on which may be carried devices participating in the replenishment operation. Casing 305 may also carry on bracket 305$^a$, Fig. 31, having an outboard bearing 307 for a shaft 308 extending transversely of the casing and depended upon to work connections for feeding new bobbins out of a replenishment bobbin magazine 310 mounted on a floor standard 309 in a position, see Fig. 1, to cooperate with the devices carried by the frame 300 at one end of the reciprocating stroke of the frame 300 in respect to the remainder of the machine.

Casing 305 and an upwardly extending support 306 on the bracket 305$^a$ may also carry the bobbin feeding devices proper. These parts in common carry a gravity chute 312, delivering into the top of the directing support 230 of the passing carriers 10. These arrangements are such as are appropriate to taking a full bobbin out of the magazine 310, carrying it into the top portion of the casing 305, finding its end, and, having found the end of the cheese, as presently described, assembling the two ends, tying them together; and then dropping the bobbin through the chute 312 into the unwinding holder 220 of carrier 10, in respect to which the frame 300, casing 305 and its attachments are at that time traveling in the same direction and at the same rate. It will be understood that the new bobbin may be received at the end of the reciprocating stroke of the frame 300, carried back with this frame into relation with one of the traveling cheeses, and then moved forward again to the point of discharge of that bobbin, and receipt of a fresh one.

The reciprocal motion of the frame 300 and its attachments at the rate of travel of the chain 30 may be provided for in any convenient form, for example as best shown in Figs. 1, 2, 26, 27, 28 and 29. The preferred mechanism provides devices for coupling the frame 300 and its attachments to the shaft 38, and gravity or spring actuated means operating upon uncoupling the frame 300 to return said frame to its initial position, whereupon it is again coupled to the shaft 38.

For example, there may be keyed upon the shaft 38 above its bearing in the boss 302 a ratchet 320. The upper member of the frame 300 carries a pawl 322, Figs. 26 and 29, on a strong shouldered pivot screw 321 in an upwardly extending boss on the frame 300. The pawl 322 is provided with a spring 323 and with a circular tail 324 adapted to be controlled by a concave-faced latch 325 pivoted at 326 to a radius arm 327 adapted for limited motion about the shaft 38 as a center. On a vertical frame member 1$^a$ a detent 328 is in the path of an end 329 of the latch 325.

The frame 300 is urged clockwise in respect to the shaft 38, Figs. 1 and 2, for example by a flexible cable 330 running over a sheave pulley 331, Fig. 2, fixed on the standard 150 and an adjustable weight 332 therefor. When the end 329 of the latch 325 encounters the detent 328 the radius arm 327 is moved clockwise, Figs. 26 and 29, to cause the latch 325 bearing on the round tail 324 of the pawl 322 to lock the pawl out of reach of the teeth of the ratchet 320; see Fig. 29. The frame 300 now swings under the stress of the weight 322 until its upper frame member comes into contact with a spring buffer 335 rigidly mounted on a bracket 336 on a transverse strut 1$^b$ of the main machine frame. The bracket 336 has an extension 337 in the path of the end 329 of the latch 325 and when the buffer 335 has brought the frame 300 to rest, the pawl 322 is released by counterclockwise motion of the radius arm 327 and turning of the latch 325 upon its pivot 326 induced by striking the extension 337. The frame 300 thereby begins another forward (clockwise) reciprocation.

The devices carried by the casing 305 and support 306 are power operated, and in order to transmit driving impulses to them from the power driven connections of the machine provision is made to actuate a primary drive sprocket 340 mounted on a vertical stud shaft 341 by gearing deriving its motion from the forward reciprocatory motion of the frame 300. The shaft 38 has a lower bearing on a longitudinal strut 1$^c$ of the main machine frame, and above the upper face of a bearing boss on said strut a sprocket wheel 342 in the same horizontal plane as the sprocket wheel 340 is loosely mounted on the shaft 38. The sprocket wheel 342 is integral with or attached to pinion 343 intermeshing with a transmission gear 344 fast on a pinion 345 adapted to rotate on a vertical stud shaft 346$^a$ rigidly mounted on the strut 1$^c$ and in turn meshing with a larger gear 346 integral with a ratchet 347 and loose on shaft 38.

Above the ratchet 347 is a plate 348 having a bearing boss loose on the shaft 38 and keyed at 349 to the boss 302 of the frame 300 and which plate 348 therefore partakes of the reciprocatory motion of the frame 300. On the under side of the plate 349 a spring pawl 350 drives the ratchet 347 and the gearing 346, 345, 344, 343 and sprocket 342 at an increased rate on the forward stroke of the frame 300. The sprockets 340 and 342 are connected by a chain 351.

Integral with the sprocket 340 a bevel gear 352 meshes with a bevel pinion 353, Fig. 31, on a short transverse shaft 354 provided with a sprocket 355 driving a chain 356 and a sprocket on the transverse driving shaft 308. The shaft 308 is a timing or cam shaft actuating the several parts of the replenishing mechanism.

The frame 300 carries mechanism supported in an upper pivoted extension 361 of casing 305 having legs 362 carried within the upper end of the casing 305 and pivoted, for limited motion in the plane of Fig. 30, on the shaft 360. One of the legs 362 is provided with an arm 363 carrying an anti-friction roller 364 resting on the periphery of a cam 366 fast on the shaft 308. A spring 367 urges the upper end of the extension 361 toward the path of travel of the partially wound cheeses going around the end of the machine.

The forward and back motions of the extension 361 correspond to cycles of operation of end-finding and knot-tying devices, which devices and their support 361 are hereinafter for convenience referred to as the tying-in head.

The extension 361 preferably carries some form of pulling-off and holding device for the loose yarn ends of the winding cheese and the unwinding bobbin. As shown this may comprise an electrically driven fan of the vacuum-cleaner type shown at 370 having a laterally elongated suction nozzle at 371. Energy for the electric motor is provided through flexible conductors 372 from any convenient source, not shown.

The shaft 360 may be utilized as a cam shaft for determining the operation of the knot-tying devices, and a transmission shaft for the rotation of end-finding devices, and for this purpose may be driven through sprockets attached to the shaft 308 and the shaft 360 by a sprocket chain 375. Transmission of power required for rotating devices in the tying-in head is preferably through a grooved pulley 376 on shaft 360 and round belt 377 driving a counter shaft 378, Figs. 34 to 40.

*The bobbin positioning and feeding means.*—Referring to Figs. 42, 43 and 44, the bobbin magazine 310 carried by the extension 385 of the standard 309 may be of any preferred type holding a sufficient number of wound unwinding carriers to serve the purpose of the machine; or, not shown, the magazine 310 may be itself fed from a larger source of supply bobbins. Preferably, see Fig. 1, the bobbins are held so as to feed downward by gravity into horizontal position lying transverse of the principal longitudinal axis of the machine, see Fig. 1, and for that purpose the extension 385 of the standard 309 may comprise a plate 386 riveted to the back of a suitable sheet metal container used for the magazine 310, said container having any suitable releasing means for the bottommost bobbin B. Preferably on the left or rear face of the magazine 310 a spring held rock shaft 387 in lugs 388 attached to the magazine is provided with rockers 389, 389 at each end, said rockers each having upper and lower detents respectively 390 and 391, the upper detents acting through the apertures 392 in the back of the magazine and serving to detain a bobbin one or two removed from the bottom of the magazine against gravity whenever the detents 390 are moved to release the bottommost bobbin. This effect may be aided by a forward bend at 393 in the bobbin magazine.

The rock shaft 387 is normally positioned by its spring 394 to hold the lowermost detents 390 in operative position. The shaft 387 may be rocked against the spring 394 to release the lowermost bobbin and insert the detents 391 to operative position by a bunter arm 395 having a lower end 396 positioned and adapted to be struck by some part of the reciprocating carriage moving with the frame 300. As shown the back face of the casing 305, comprised of the upper end of the chute 312 preferably serves this purpose. Motion of the frame 300 about the center of shaft 38 causes the chute 312 to come into alignment at the end of the stroke of reciprocation counterclockwise in Fig. 1 with the lower end of the magazine 310, see Figs. 30, 43.

At the top of the support 306 the chute 312 (which may be provided, Fig. 30, with a longitudinal slot 312ª extending its full length on its rear face as viewed in Fig. 31) is extended horizontally at 400 to form a way for a reciprocating supply bobbin carrier device 401 best shown in Figs. 34 to 37 inclusive and comprising a cylindrical structure having an interior bridge at 402 bored and threaded for a driver pintle 403 which projects forwardly of Fig. 31 through a horizontal slot 404, and is embraced outside of the way 400 by a slot 405 in the upper end of a driver lever 406 pivoted to the casing 306 at 407 and having a roll 409 taking into the cam groove of a barrel cam 410 fast on the shaft 308, which, as above described, is among the devices operated by the chain 351 during the forward stroke of reciprocation of the frame 300 and its attachments. The positions of the cam 410, the lever 406 and the remaining parts are such as to secure that the bobbin carrier 401 is to the right in the position of Figs. 31 and 34 at the end of the reciprocating stroke of the frame 300 and casing 305 and support 306.

In an internal bore of the bobbin carrier 401 a rotatable sleeve 412 having an annular groove 413 is held for rotation by a ring segment 414. On the transverse bearing pin 415 in the sleeve 412 a split bobbin carrier device 416, 416 is normally held open by the reaction of a compression spring 417. But the tapered normally open jaws of the bobbin carrier 416 are normally not so far apart as not to enter the central bore of a properly positioned bobbin B. Nevertheless a bobbin entered by the jaws 416, forced together by the bore of the bobbin, is frictionally held by the jaws 416 and spring 417 so as to be capable of reciprocatory movement and rotation with the rotatable sleeve 412.

Referring now to Fig. 43, whenever the bunter 396 is struck by the rear portion of the chute 312 at the top of the support 306, one of the bobbins B is delivered by gravity into the top portion of the chute 312 and into line with the way 400 for the bobbin carrier 401. The bobbin so fed out of the magazine 310 is positioned with its central bore in alignment with the split carrier device 416, 416 by a pivoted support made as a spoon 420 having an up-turned end piece or gate 421 and carried by and adapted to rock with the rock shaft 422, Fig. 43, Fig. 32, having a bearing along the back surface of the way 400, see Figs. 32, 34, 35, 36 and 43. Referring to Figs. 32, 35 and 36, rock shaft 422 is provided with an arm 423 actuated by a vertical rod 424 sliding in bearings 425 forming a part of the support 306 and normally held down by spring 427. The lower end of the arm 424 is bent forward to pass through an aperture 428 in the support 306 and provided at its lower end with an anti-friction roller 429, Figs. 31 and 32, contacting with a disk cam 430 on the shaft 308.

Unless and until the spoon 420 and detent gate 421 are moved out of the way by the operation of the rock shaft 422 and rod 424, a bobbin gravity-delivered in line with the way 400 and in the upper part of the chute 312 remains in that position and is carried with the casing 305, support 306 and the frame 300 on its back or idle stroke. But so soon as the shaft 308 is actuated the bobbin carrier 401 enters the bore in the bobbin B and gate 421 is lowered after this entrance and the carrier 401 and the bobbin are moved forward in respect to the head 361 into the position shown in Fig. 35, the head 361 at this time being at the right hand end of its oscillatory movement on the axis 360 as viewed in Fig. 30 and Fig. 39. This motion preferably occurs during a part of the forward stroke of the frame 300 and after the head 361 has been positioned in juxtaposition to and with some of its carried devices operating in respect to a core tube 147 or a partly wound cheese carried by one of the spindles 26 of one of the carriers 10. Assuming for the moment that operations described below have taken place, the carrier 401 after operations have been performed on the leading end of the yarn of the bobbin carried by it will be retracted to the position shown in Fig. 34, and during the last part of this retraction the bobbin B will be stripped from the carrier 401 and split spindle 416 by a detent 435 pivoted at 436 to the under side of the extension 400 and operated at the proper time to enter between the sleeve 412 and the head of the bobbin by the spring pressed thrust rod 437 cranked forward through the aperture 428 and having at its lower end an antifriction roll 439 cooperating with the cam 440 on the shaft 308. It will be observed that the bobbin carrier 401 makes a stroke to the left during the operative cycle of the replenishing devices, positions its carried bobbin for rotation in respect to the head 361 in about the position shown in Fig. 35 and in Fig. 39, and thereafter retires to the position of Fig. 34, the bobbin B being stripped from the carrier 401 and dropped down the chute 312, the gate 420 being open.

The leading end of the yarn from this bobbin so dropped has been tied to the following end of the cheese or the starting wind on a bobbin tube 147, and the tied run of yarn passes out of chute 412 through slot 312$^a$.

This operation is accomplished as follows:

*The end finding and tying devices.*—Referring now more particularly to Figs. 30, 31, 34 to 41 inclusive, and the timing diagram Fig. 49, it has been explained that the head 361 oscillates about the shaft 38 as a center with the frame 300, and also oscillates about the horizontal shaft 360 in the radial plane of the shaft 38. When the head 361 moves to the left as shown in Figs. 2, 30 and 38 to 41 in respect to the carriers 10 and the cheese C or core 147 carried by the carriers 10, there is no lateral relative motion between the carriers 10 and the head 361, since the oscillating motion about the center of the shaft 38 is at the same rate as the progressive motion of the carriers 10 and the winding tube or winding package carried thereby. There is therefore an interval of travel, which may be as much as 50° of arc, while the winding carriers are going about the end of the machine on which the replenishment devices including the head 361 travel with the winding package or a core or tube for a winding package. During this travel the machine performs the operations of finding the exhausted or broken end of the surface of the winding package (or the end of a preliminary winding on the tube or carrier for the wound package); gripping this end; carrying this end away beneath the locus of motion of the bobbin B into and in front of the head 361, finding and gripping the end of the new yarn on the bobbin B, assembling the new yarn on the exhaust end from the winding package in the same vertical plane; tying these ends together and cutting off the surplus ends of the yarn; stripping the tied knot and releasing the tied ends; and, as above described, placing the replenishment bobbin whose yarn is now tied to the exhausted end in the winding holder 220 appropriate to the winding package.

The devices for the above purposes may be any competent devices for performing these operations, or they may be replaced or substituted for by any device capable of performing the operation of uniting the broken or exhausted end going to the winding package and the leading end of the unwinding package. For example, it is within the purview of this invention to stop the winding package by the means above described or other means upon the breakage or exhaustion of the yarn being wound and to leave the unwound end of the exhausted or broken yarn in position to be conjoined to the unwound end of a supply bobbin, by knotting or otherwise, of a new supply bobbin fed to an unwinding carrier such as one of the unwinding holders 220 by so much of the above-described mechanism as it is desirable to use for this purpose. It is within the invention to merely approach and position these two ends and to obtain the advantages of the remaining automatic apparatus by depending upon an operator stationed at the end of the machine to tie these ends together by the operation of a hand knotter, or otherwise. It will therefore be understood that the end-finding, holding and tying devices about to be described are instances only of automatic devices for this purpose and that it is not essential to the operation of the machine that any such devices should be employed or that the particular devices about to be described should be employed.

Assume now that the frame 300 has begun a forward motion (counterclockwise in respect to Fig. 1), the head 361 is then central on the same radial plane of the shaft 38 as the carrier 10, the spindle 26 and axis of the core tube 147 (which may have only the starting winding but may carry a partially completed cheese C) being parallel with the axis of the shaft 378 in the head 361; this relation continues throughout motion of frame 300.

Referring now to Figs. 30, 34 and 38, head 361 oscillates forward toward the elevated and stationary winding package by the operation of the cam 366 and spring 367 until contact takes place between the surface of the winding package or its carrier 147 and devices carried by the head 361.

Preferably these devices are a friction drive roll 450 on a stud shaft 451 having shoulder 452 adapted to take into a sector slot 453 of a lever 454 for relative motion in the sector slot 453 against a spring 455. Lever 454 is attached to a crank arm and sleeve 458, the sleeve being bored for a transverse shaft 456 having a bearing in the head 361. The sleeve and arm 458 are adapted to be rocked by a link 459 extending downwardly through the head 361, see Figs. 31, 33, and terminating at the bottom in an enlargement 468 slotted at 461 to take over the shaft 360 and provided with an anti-friction roller 462 taking into a cam groove 463 in the cam 464 on shaft 360. By the operation of the cam 464 forward motion of the head 361 is accompanied by downward motion of the tractor roller 450. When the tractor roll bottoms against a tube or carrier 147 or a partially completed cheese C, the shaft 451 can yield against the spring 455.

The roll 450 is driven whenever the parts in the head 361 are actuated by a belt 466 on a pulley 467 on the shaft 456 which is driven by a pulley 468 and cross belt 469 and pulley 470 on the shaft 378.

The roll 450 may be covered with rubber and is operated by its belt 466 to drive the cheese or tube 147 with which it is in contact in a direction to unwind.

The surface of the cheese or the pre-winding on the roll 147 is swept during this motion induced by the roller 450 by a brush roll 475 on a transverse shaft 476 of the forward extension 457 of the head 361. This brush roll is driven by the pulley 477, belt 478 and pulley 479 on the shaft 478. The line of motion of the center of rotation at 476 of the brush 475 is toward and from the position of the axis 26 upon which the winding package rotates and the surface of the brush roll 475 will therefore reach contact with the winding package whatever its attained diameter may be.

The operation of the brush roll 475 is to lift from its attachments to the winding package the exhausted or broken end. The nozzle 371 of the suction apparatus 370 is at the delivery side of the brush and the released end enters the nozzle 371 and is competently held for subsequent operations.

Referring now to Fig. 38, the head 361 backs off under the operation of the cam 366 for the next step to the position of Fig. 39. This is the position in which the bobbin carrier 401, Figs. 34 to 37, becomes active to advance the new bobbin B to the position shown in Fig. 35 and Fig. 39. The roll 450 has meanwhile been retained in a lowered position by the operation of lever 454, and its actuating cam 464, Fig. 33, yielding against spring 455 to pass over the bobbin B and to contact with and drive the bobbin B in a direction to unwind its yarn. This takes place while the surface of the unwinding package B is in contact with the brush roll 475, with the result that the leading end of the unwinding package is taken in by the suction nozzle 371, which now holds both ends.

Referring now to Fig. 40, the head 361 backs off further to the position shown in said figure by the operation of the high part of the cam 366.

The forward extension 457 of the head 361 carries instrumentalities for assembling the two yarns in the same radial plane of the shaft 38, preferably about centrally of the length of the winding and unwinding packages, now positioned as shown in Fig. 40 and both stationary, except as they may be rotated by the unwinding of their yarns held by the suction nozzle 371. These assembling means preferably include upper and lower jaw-clamp members 480 and 481 respectively, of which the upper member carries a yarn positioning fork having right and left members 482 and 483 respectively, see Figs. 34 to 36 and 38 to 41. The clamp jaw members 480, 481 may be central on shouldered pivot screws 484 and 485 respectively, and said jaws are embodied in toothed sectors 486, 487 respectively in mesh with the other. The sector 487 may have an arm for shouldered pivot screw 488 to which is connected a link 489, see Figs. 30 and 31, also held downwardly by a spring 490 to bring an anti-friction roll 491 at the end of the link 489 against the periphery of the actuating cam 491 on the left-hand end of the shaft 360 as viewed in Fig. 31. The operation of the cam 492 is such as to close the jaws 480, 481 into the position shown in Fig. 40 and Fig. 36 at the stage of the operation represented by Fig. 40.

The operation of the positioning fork 482, 483 is such as to bring the assembled and clamped ends into the central plane as will be obvious from inspection of Figs. 36 and 40. The free ends of the assembled yarns in this position extend past the tying bill or the active knot forming element of a knot tying device 500, Figs. 36 to 47 inclusive.

*The knot tying mechanism.*—Preferably as best shown in Fig. 36 the tying bill 501 (which may be of familiar type shown enlarged partly in section in Fig. 48, having a cutter and clamp member 502 adapted to cut the yarns between the member 502 and a cutting jaw 503 and clamp the yarns severed near their ends between one face of the member 502 and another jaw 504 of the knotting bill) is carried by a bearing sleeve 505 mounted on a radius arm 506 (Fig. 36) central on the right-hand end of the shaft 476 as viewed in Fig. 34.

Pivoted jaw 502 may be worked by a barrel cam (not shown) at the end of the sleeve 505 carried by the radius arm 506. The shaft 507 and sleeve 505 are long enough to bring the knotter bill 501 to the central plane in which the yarns are held by the devices above described.

In order to tie a seamstress' knot of two yarns by the usual operation of the bill 501 the yarns are first laid in the crook of the bill. This may be accomplished by the proper motion of the knotter about the shaft 476 into contact with the positions of the yarns. Thereafter the knotter bill is turned one and one-quarter revolutions, which completes the formation of the knot on the bill and cuts the free ends of the yarns. The knotted yarn ends are then pulled out of the jaws 503, 504, and the knot set up by this pull. In the present instance this set-up and knot-stripping motion is secured by the proper motion of the knotter in relation to the clamp 480, 481 after it shall have rotated one and one-quarter revolutions to form the knot.

Referring to Figs. 45, 46 and 47, particularly, the rotative motions of the tying bill 501 are preferably secured by cooperation between the radius arm 506 and a concentric sector 510 having teeth meshing with the pinion 508, having a bearing boss 511 bored to bear on the shaft 476, and connected to the radius arm 506 by a pin 512, spring 513 and pin 514, on the radius arm 506 and taking through sector slot 515 in sector 510. Sector 510 is the driver for the radius arm 506, and relative motions between the radius arm 506 and the sector 510 serve to actuate the tying bill shaft 507. The sector 510 is operated by a shouldered pivot screw 517 taking over a link 518, in turn pivoted at 519 to an arm 520 rigid with the lever 454 upon which the tractor roll 450 is mounted, and therefore adapted to be moved when the sleeve and arm 458, Fig. 34, are operated by the link 459; all of these parts rocking about the shaft 456, as above explained.

Referring now to Fig. 33, the cam 464 operating the link 459 thrusts upwardly on this link to position operatively the tractor roll 450. These movements rock the knotter driver sector 510 idly. But the cam track 463 comprises a slope adapted to pull down on the link 459, and this moves the parts consecutively from the position of Fig. 45 to the position of Figs. 46 and 47, and thereafter restores the parts to the position of Fig. 45.

In order first to position the tying bill 501 in relation to the yarns to be knotted and then to tie the knot by turning the shaft 507, a stop pin 525, fast in one of the walls of the head 361, encounters the radius arm 506 and stops its movement with the driver sector 510, the spring 513 extending, as shown in Fig. 47, to permit relative movement of the sector 510 to rotate the shaft 507. This is the operative rotation of the tying bill; during it the convolution of the knot is formed on the bill, the waste ends severed (and removed by the suction device 71), and the severed ends held by the bill 501.

To set up the knot it is preferred to rely upon the bodily movement away from its operative position of the tying bill, which takes place in respect to the closed clamps 480, 481, before these are opened by upward motion of the link 489. For this purpose one preferred means comprises a sector slot 526 in the driver sector 510 into which takes a locking pin 527 on the radius arm 506. On the face of sector 510 a bell crank latch lever 528 having a notched end is held by a light spring 529 to engage the pin 527 at the extreme of the relative movements of radius arm 506 and driver sector 510, Fig. 47. Pin 525 is in the path of movement of the cam lug 530 projecting toward the pin 525 from the tail 531 of the latch lever 528. On the return motion of the parts the lug 530 reacts with the pin 525 to lift the latch 528 from the pin 527 and thus to restore the parts to their starting position, shown in Fig. 45. The retreating motion downwardly and outwardly of the shaft 507 and tying bill 501 sets and strips the knot. This will be clear from inspection of Fig. 41, which shows the parts in their final position.

The frame 300 and its attachments now returns to repeat the functions of its carried devices in respect to another partially wound cheese or new core 147, whichever may be on the next carrier 10. It will be understood that a new bobbin B positioned as shown in Fig. 34, returns with the frame 300.

Referring now to Figs. 1, 3, 4 and 5, the unwinding holders 220 having been replenished, the yarns automatically threaded through the tension and stop motion devices, if such are employed, the winding carriers are ready to resume operation, whether the winding package is a mere core with a prewinding or a partially completed cheese. It will be recalled that the carriers 27 are latched in their elevated position by the latch 105 during passage around the end of the machine. The latch levers 105 are now released by contact of their cam ends 142 with the cam 141 and the carriages 27 resume their normal position shown in Figs. 3 and 4, the distance dropped by them depending upon the diameter of the winding on the cores 147.

Referring to Figs. 3 and 4, standing under the portions 142 of the levers 105 and pivoted on the heads 21 are resetting levers 540 each connected by a link 541 to an arm 542 on the stop motion brake 255. The unlocking motion of the cam end at lever 542 and latch 105 resets the lever 255 which is locked in the resetting position by the spring lever 250.

Winding now proceeds until the winding packages have traveled to the left end of the tractor roll 51, Fig. 1. It is desirable to lift the winding cheeses away from the tractor rolls for passage about the left end of the machine. This is done by the operation of a crutch head 97ª on a slide 91ª operated by the cam 80 on the end of the cam shaft 79, these devices operating in the same way as the lever 93 and lever 91, above described, except that it is not here necessary to discriminate between full and partially completed cheeses so that the crutch head 97ª may be a simple projection from the slide 91ª. Carriages 27 are locked in their upper position by the latch levers 105 while going around the left end of the machine and are again unlocked by the cam 141.

The operations of the machine will now be apparent without further description, having been described serially in connection with the agencies of the machine. It will be observed that so long as cores are kept in the magazine 148 and new bobbins B are kept in the magazine 310 the machine is adapted automatically to continue operation without more than casual attendance.

The invention has been described in relation to that kind of winding operation which produces a cylindrical cheese, but it will be observed that the spindles 26 might as well be replaced by cone holding spindles for conical cores positioned on carriages 27 to hold an element of the core surfaces parallel with the tractor rolls 50, 51, whereupon the machine is adapted to wind conical packages without further change except to conformably change the direction of the donning stroke of the core replenishing devices and to provide a core magazine suitable to direct and feed conical cores, and to change the angle of the plane of contact of the end-finding devices to conform to the conical winding. The invention is therefore obviously in respect to these and other modifications and substitutions, independent of the particular constructions shown, except in so far as they may be specifically claimed.

We claim:

1. A winding machine having therein a carrier for moving a winding mass of yarn in a predetermined path, means for winding yarn on the mass during such motion to form a traverse wound self-sustaining headless package by overlapped layers of reversed spiral windings, and means having a rotary element traveling with the carrier for traversing the winding yarn.

2. A winding machine having therein a carrier for moving a winding mass of yarn in a predetermined path, means for winding yarn on the mass during such motion to form a traverse wound self-sustaining headless package by overlapped layers of reversed spiral windings, an unwinding supply holder traveling with said carrier, and means having a rotary element traveling with the carrier for traversing the winding yarn.

3. A winding machine having therein a carrier for moving a winding mass of yarn in a predetermined path, means for winding yarn on the mass during such motion to form a traverse wound self-sustaining headless package by overlapped layers of reversed spiral windings, means having a rotary element traveling with the carrier for traversing the winding yarn in the same direction during a plurality of revolutions of the winding mass, and in the opposite direction, and driving means for said winding mass and rotary element common to both.

4. A winding machine having therein a carrier for moving a winding mass of yarn in a predetermined path, means for winding yarn on the mass during such motion to form a traverse wound self-sustaining headless package by overlapped layers of reversed spiral windings, means for driving the winding mass during travel in the path of motion of the carrier by contact with a rotary driver, and traversing means for the wound yarn adapted to be driven by said rotary driver.

5. A winding machine having therein a carrier for moving a winding mass of yarn in a predetermined path, means for winding yarn on the mass during such motion to form a traverse wound self-sustaining headless package by overlapped layers of reversed spiral windings, means for driving the winding mass during travel in the path of motion of the carrier by contact with a rotary driver, traversing means for the wound yarn adapted to be driven by said rotary driver, and means for cessation of driving of said wound mass and such traversing means during travel in parts of said path of motion.

6. In a winding machine having a winding mass driving tractor roller and means for causing a winding and unwinding pair to traverse the length of the roller during winding on the wound mass, yarn-guide traversing means moving with the wound mass and having driving contact with said roller during said motion.

7. In a winding machine having a winding mass driving tractor roller and means for causing a winding and unwinding pair to traverse the length of the roller during winding on the wound mass, yarn-guide traversing means moving with the wound mass and having driving contact with said roller during said motion, and means for causing cessation of driving contact between said winding mass and roller after a predetermined length of traverse in winding contact.

8. In a winding machine having a winding mass driving tractor roller and means for causing a winding and unwinding pair to traverse the length of the roller during winding on the wound mass, yarn-guide traversing means moving with the wound mass and having driving contact with said roller during said motion, and means for causing cessation of operative contact between said yarn-guide traversing means and tractor roller.

9. In a winding machine, having a winding mass driving tractor roller and means for causing a winding and unwinding pair to traverse the length of the roller during winding on the wound mass, yarn-guide traversing means moving with the wound mass and having driving contact with said roller during said motion, and means for causing cessation of driving contact between said winding mass and said yarn-guide traversing means respectively and said roller, each at a predetermined place in said traverse.

10. In a winding machine, having a winding mass driving tractor roller and means for causing a winding and unwinding pair to traverse the length of the roller during winding on the wound mass, yarn-guide traversing means moving with the wound mass and having driving contact with said roller during said motion, and means for supporting the traversing means and the winding package on said carrier severally for motion toward and away from said roller in different directions.

11. In a winding machine, having a winding mass driving tractor roller and means for causing a winding and unwinding pair to traverse the length of the roller during winding on the wound mass, yarn-guide traversing means moving with the wound mass and having driving contact with said roller during said motion, means for supporting the traversing means and the winding package on said carrier severally for motion toward and away from said roller in different directions, and automatically operating devices for causing said motions respectively at different points in the path traversed by said carrier.

12. In a winding machine, in combination, a carrier for winding pairs adapted for travel in respect to driving means for the winding member of said pairs, a rotary yarn-guide traverse cam mounted on said carrier, and means for driving said rotary traverse cam from the driving means for said winding member during travel of said carrier, and during travel of the traverse cam in the direction of its axis of rotation.

13. In a winding machine, in combination, a carrier for winding pairs adapted for travel in respect to driving means for the winding member of said pairs, a rotary yarn-traverse cam and a yarn guide worked by said cam in operative relation with the yarn between members of said unwinding and winding pair, and means for driving said rotary traverse cam from the driving means for said winding member during travel of said carrier in a direction parallel to the motion of said reciprocating yarn guide.

14. In a quick-pitch traverse motion for winding machines, the combination of a laterally movable carrier for winding and unwinding pairs of a tractor roller for driving the winding pair, and a rotary cam on said carrier having friction members adapted for friction driving and longitudinal sliding contact with said tractor roller.

15. In a quick-pitch traverse motion for winding machines, the combination of a laterally movable carrier for winding and unwinding pairs of a tractor roller for driving the winding pair, and a rotary cam on said carrier having friction members adapted for friction driving and longitudinal sliding contact with said tractor roller, and means for moving said friction member into and out of contact with said tractor roller during lateral motion of said carrier.

16. A winding machine having therein a carrier for moving a winding mass of yarn in a predetermined path, means for winding yarn on the mass during such motion to form a traverse wound self-sustaining headless package by overlapped layers of reversed spiral windings, an unwinding supply holder traveling with said carrier, and means for automatically removing unwinding-supply carriers from said holder.

17. A carrier for winding and unwinding pairs adapted for travel in respect to driving means for the winding mass, in combination with an unwinding package holder mounted on said carrier having means adapted to permit discharge of unwinding supply carriers by gravity.

18. A carrier for winding and unwinding pairs adapted to travel in respect to driving means for the winding mass, in combination with an unwinding package holder mounted on said carrier having a swinging detent adapted to permit discharge of unwinding supply carriers by gravity on displacement, and means for displacing said detent by detaining it against motion with said carrier.

19. A winding machine having therein a carrier for moving a winding mass of yarn in a predetermined path, means for winding yarn on the mass during such motion to form a traverse wound self-sustaining headless package by overlapped layers of reversed spiral windings, in combination with means on said carrier for holding and discharging an unwinding yarn supply package, and automatic means acting at a point in said predetermined path to replenish said holder with a fresh supply package.

20. A winding machine having therein a carrier for moving a winding mass of yarn in a predetermined path, means for winding yarn on the mass during such motion to form a traverse wound self-sustained headless package by overlapped layers of reversed spiral windings, in combination with means on said carrier for holding and discharging an unwinding yarn supply package adapted to receive a supply package delivered by gravity thereto, and automatic means acting at a point in said predetermined path to replenish said holder by dropping into it a fresh supply package.

21. A winding machine having therein a carrier for moving a winding mass of yarn in a predetermined path, means for winding yarn on the mass during such motion to form a traverse wound self-sustaining headless package by overlapped layers of reversed spiral windings, in combination with means on said carrier for holding and discharging an unwinding yarn supply package adapted to receive a supply package delivered thereto, means on said carrier for tensioning the yarn, and automatic means acting at a point in said predetermined path to replenish said holder by placing in it a fresh supply package and means for automatically placing the new yarn in operative relation to the tensioning devices.

22. A winding machine having therein a carrier for moving a winding mass of yarn in a predetermined path, means for winding yarn on the mass during such motion to form a traverse wound self-sustaining headless package by overlapped layers of reversed spiral windings, said carriers comprising an unwinding package holder, and a directing device adapted to guide a replenishment supply bobbin or carrier to be dropped into said unwinding holder.

23. A winding machine having therein a carrier for moving a winding mass of yarn in a predetermined path, means for winding yarn on the mass during such motion to form a traverse wound self-sustaining headless package by overlapped layers of reversed spiral windings, said carriers comprising an unwinding package holder, and a directing device adapted to guide a replenishment supply bobbin or carrier to be dropped into said unwinding holder, in combination with means for automatically discharging bobbins or carriers from said holder, and means for dropping a replenishment supply package into said directing device.

24. A winding machine having therein a carrier for moving a winding mass of yarn in a predetermined path, means for winding yarn on the mass during such motion to form a traverse wound self-sustaining headless package by overlapped layers of reversed spiral windings, said carriers comprising an unwinding package holder, a traverse guide and means for operating said traverse guide, detector devices bearing on the yarn between said traverse guide and said holder, and means permitting said detector devices to be moved to receive a yarn from a new supply inserted in said holder.

25. A winding machine having therein a carrier for moving a winding mass of yarn in a predetermined path, means for winding yarn on the mass during such motion to form a traverse wound self-sustaining headless package by overlapped layers of reversed spiral windings, said carriers comprising an unwinding package holder, a traverse guide and means for operating said traverse guide, tension devices bearing on the yarn between said traverse guide and said holder, said tension devices having freedom of motion to receive a yarn from a new supply moved into said holder past their working position.

26. A winding machine having therein a carrier for moving a winding mass of yarn in a predetermined path, means for winding yarn on the mass during such motion to form a traverse wound self-sustaining headless package by overlapped layers of reversed spiral windings, said carriers comprising an unwinding package holder, and a directing device adapted to guide a replenishment supply bobbin or carrier to be dropped into said unwinding holder, in combination with a tension and detector mechanism operating at the position of said directing device, and having yarn contacting devices mounted removably in the path of motion of a replenishment supply into said unwinding holder.

27. A winding machine having therein a carrier for moving a winding mass of yarn in a predetermined path, means for winding yarn on the mass during such motion to form a traverse wound self-sustaining headless package by overlapped layers of reversed spiral windings, said carriers comprising an unwinding package holder, and a directing device adapted to guide a replenishment supply bobbin or carrier to be dropped into said unwinding holder, in combination with means adapted to move the winding mass of yarn away from its driving means, a stop for holding said means out of operation, tension mechanism on said carrier, and a connection from said tension mechanism to said means for moving the winding yarn mass adapted to release said stop on undue tension.

28. A winding machine having therein a carrier for moving a winding mass of yarn in a predetermined path, means for winding yarn on the mass during such motion to form a traverse wound self-sustaining headless package by overlapped layers of reversed spiral windings, said carriers comprising an unwinding package holder, and a directing device adapted to guide a replenishment supply bobbin or carrier to be dropped into said unwinding holder, in combination with a tension and slub and breakage detector mechanism operating at the position of said directing device and means for stopping motion of the winding mass on breakage or exhaustion detected by said detector mechanism.

29. In combination, in a winding machine having carriers for winding and unwinding pairs adapted to be circulated about the machine during the winding operation, a breakage or exhaustion detector and a winding package stop motion device carried by each carrier, and means for operating said stop motion devices severally upon detection of breakage or exhaustion by any of said detectors.

30. In combination, in a winding machine having carriers for winding and unwinding pairs adapted to be circulated about the machine during the winding operation, a breakage or exhaustion detector and a winding package stop motion device carried by each carrier, and means for operating said stop motion devices severally upon detection of breakage or exhaustion by any of said detectors, a resetting device for said stop motion, and automatic means having an element relatively fixed in relation to the travel of said carriers for resetting the stop motions preparatory to winding from replenished supplies.

31. In combination, in a winding machine having carriers for winding and unwinding pairs adapted to be circulated about the machine during the winding operation, means operating at a place in the circulatory path of travel of said carriers for automatically detecting a full winding package, and means operated thereby for positioning said package for doffing.

32. In combination, in a winding machine having carriers for winding and unwinding pairs adapted to be circulated about the machine during the winding operation, means operating at a place in the circulatory path of travel of said carriers for automatically detecting a full winding package, means operated thereby for positioning said package for doffing, and means operating to doff said positioned package.

33. In combination in a winding machine having carriers for winding and unwinding pairs adapted to be circulated about the machine during the winding operation, doffing means comprising a pusher adapted to act on full packages displaced in relation to their winding supports, and means for measuring the diameter of the packages and displacing full packages into relation with the pusher.

34. In combination, in a winding machine having means for circulating winding pairs, supply package holders, means to release spent supply packages for discharge by gravity from the holders operating at a place in the path of circulation, and a conveyor receiving spent supply packages dropped therefrom.

35. In combination, in a winding machine having means for circulating winding pairs, a winding spindle for each winding package, full package doffing means operating to remove a full package from its spindle and release said package at a place in the path of circulation, and a conveyor receiving full packages dropped by gravity therefrom.

36. In combination, in a winding machine having means for circulating winding pairs, a spindle for supporting the winding package, means for doffing full packages from the spindles, and devices operating as a consequence of the removal of the full package for placing a carrier for another winding package on said spindle.

37. In combination in a winding machine having carriers for winding and unwinding pairs adapted to be circulated about the machine during the winding operation, winding package spindles on said carriers, means for latching said spindles in position to doff a full package, a winding core magazine and core feeding means positioned in relation to the path of travel of said carriers, and normally restrained means for placing a core on a passing spindle adapted to be operated by a doffer package.

38. In winding core feeding and applying mechanism for a circulatory-winding-pair winding machine, the combination of a motor device energized by connections to the winding machine and of a core magazine and core placing devices operated by the motor, with a restraining detent released by passage of a doffed package.

39. An automatic winding machine of the kind having carriers for circulating winding yarn packages and unwinding supply packages in relation to devices for driving the winding packages and adapted successively to move the carriers along rotary winding package drivers, having devices operating at that part of the path of circulation between successive passages along the winding mass drivers for replenishing the winding supply.

40. An automatic winding machine of the kind having carriers for circulating winding yarn packages and unwinding supply packages in relation to devices for driving the winding packages and adapted successively to move the carriers along rotary winding package drivers, having means operating at that part of the path of circulation between successive passages along the winding mass drivers to unite the following end of the winding yarn on a winding package to the leading end of a replenishment unwinding supply package, for replenishing the winding supply.

41. An automatic winding machine of the kind having carriers for circulating winding yarn packages and unwinding supply packages in relation to devices for driving the winding packages and adapted successively to move the carriers along rotary winding package drivers, having means operating at that part of the path of circulation between successive passages along the winding mass drivers to unite the following end of the winding yarn on a winding package to the leading end of a replenishment unwinding supply package, and means for delivering said replenishment package to a holder circulating with the carrier for the winding package, for replenishing the winding supply.

42. An automatic winding machine of the kind having carriers for circulating winding yarn packages and unwinding supply packages in relation to devices for driving the winding packages and adapted successively to move the carriers along rotary winding package tractor rolls, having devices operating at that part of the path of circulation between successive passages along the winding mass tractor rolls to tie together the following end of the winding yarn on a winding package and the leading end of a replenishment unwinding supply package.

43. An automatic winding machine of the kind having a carrier adapted to move a winding package in a circulatory path in the direction of the axis of rotation of the winding package and successively to bring the surface of the winding package into sliding and rotative driving contact with each of a plurality of tractor rolls, having means operating during passage of the carrier from one to the other of said tractor rolls to deliver to the carrier a replenishment unwinding supply.

44. An automatic winding machine of the kind having a carrier adapted to move a winding package in a circulatory path in the direction of the axis of rotation of the winding package and successively to bring the surface of the winding package into sliding and rotative driving contact with each of a plurality of tractor rolls, having means operating during passage of the carrier from one to the other of said tractor rolls to deliver to the carrier a replenishment unwinding supply, and means operating during said passage to assemble and knot together the following end of the yarn wound on the winding package and the leading end on the replenishment supply.

45. An automatic winding machine having therein, in combination with traveling carriers for winding and unwinding supply packages, a relatively stationary magazine for replenishment supply packages, means traveling with the carriers for a limited distance to receive a supply package from the magazine, and means for delivering supply packages to said carriers during travel together of said means.

46. An automatic winding machine having therein, in combination with traveling carriers for winding and unwinding supply packages, a relatively stationary magazine for replenishment supply packages, and means adapted to travel with each of said carriers for a limited distance for delivering supply packages to said carriers during their passage by said means.

47. An automatic winding machine having therein, in combination with traveling carriers for winding and unwinding supply packages, means for discharging spent supply packages from the moving carriers, a relatively stationary magazine for replenishment supply packages, and means traveling with the carriers for receiving supply packages from the magazine and delivering supply packages to said carriers during their travel.

48. A winding machine adapted to wind headless self-sustaining traverse wound packages during circulation of a carrier for an unwinding and a winding package about the machine, having devices for suspending winding motion of the winding package during a part of its circulatory travel, in combination with an unwinding holder traveling with the winding package, and devices traveling with the carrier and operating during said suspension of winding motion to unwind the leading end of a replenishment unwinding supply package and place said replenishment package in said holder.

49. A winding machine adapted to wind headless self-sustaining traverse wound packages during circulation of a carrier for an unwinding and a winding package about the machine, having devices for suspending winding motion of the winding package during a part of its circulatory travel, in combination with means for assembling the end of the yarn on said winding packages with the leading end of the yarn of a replenishment unwinding package to enable these ends to be tied together, in combination with means for removing the tied-in replenishment package after tying to a holder therefor traveling with said carrier, and means for resuming winding motion.

50. Replenishing devices for winding machines having circulatory winding pair carriers having in combination a supply package receiving device adapted to travel with a carrier during motion in one direction in a reciprocatory path, an unwinding supply magazine adapted to load a supply package to said receiving device at one end of its motion, means acting on a subsequent motion of said receiving device to deliver the supply package to one of said carriers.

51. A winding machine having means for winding packages circulating about the machine on carriers, in combination with means for circulating the carriers, a frame adapted to carry devices for delivering replenishment supply packages to the carriers, and means for locking said frame to driving means moving with said carriers during a predetermined travel of the carriers, and means for unlocking and retracting said frame.

52. A winding machine having means for winding packages circulating about the machine on carriers, in combination with means for circulating the carriers, a frame adapted to carry devices for delivering replenishment supply packages to the carriers, driving means for said delivering devices actuated upon motion of said frame in one direction, and means for locking said frame to driving means moving with said carriers during a predetermined travel of the carriers, and means for unlocking and retracting said frame.

53. A winding machine having means for winding packages circulating about the machine on carriers, in combination with means for circulating the carriers, a frame adapted to carry devices for delivering replenishment supply packages to the carriers and devices for assembling and tying together ends of yarn from the winding package and a replenishment unwinding package, means for locking said frame to driving means moving with said carriers during a predetermined travel of the carriers, and means for unlocking and retracting said frame.

54. A winding machine having means for winding packages circulating about the machine on carriers, in combination with means for circulating the carriers, a frame adapted to carry devices for delivering replenishment supply packages to the carriers, and driving means for said assembling and tying devices actuated upon motion of said frame in one direction, means for locking said frame to driving means moving with said carriers during a predetermined travel of the carriers, and means for unlocking and retracting said frame.

55. A winding machine having means for winding packages circulating about the machine on carriers, in combination with means for circulating the carriers, a frame adapted to carry a knot-tying head, means for coupling said frame to and releasing it from a part moving with one of the carriers, means for retracting the frame after motion with the carriers, and means for moving the knot-tying head toward and away from a winding package on said carrier in stages consequent upon motion of said frame with said carrier.

56. A winding machine having means for winding packages circulating about the machine on carriers, in combination with means for circulating the carriers, a frame adapted to carry a knot-tying head, means for coupling said frame to and releasing it from a part moving with one of the carriers, means for retracting the frame after motion with the carriers, and means for moving the knot-tying head toward and away from a winding package on said carrier in stages consequent upon motion of said frame with said carrier, and means in said knot-tying head for operating upon the yarns of said winding package and a replenishment package to assemble and tie them together during motion of the frame and carrier in coupled relation.

57. A winding machine having means for winding packages circulating about the machine on carriers, in combination with means for circulating the carriers, a frame adapted to carry a knotter head, means for coupling said frame to and releasing it from a part moving with one of the carriers, means for retracting the frame after motion with the carriers, and means for moving the knot-tying head toward and away from a winding package on said carrier in stages consequent upon motion of said frame with said carrier and corresponding to seizing the end of the winding-package yarn, seizing the end of the replenishment supply yarn, assembling the ends, and tying and stripping a knot in the assembled ends.

58. The combination with a circulating carrier for winding and unwinding pairs and means for circulating said carrier of a replenishment unwinding supply magazine, a frame for a knotter head adapted to be coupled to a part moving with said carrier and uncoupled therefrom, yarn-end assembling and knot-tying devices on said frame movable toward and away from said carrier and means on said frame for positioning a replenishment supply package and the winding package on said carrier in position for their yarns to be acted upon successively by said assembling and tying devices during motion of said devices away from said carrier.

59. Replenishing mechanism for winders having therein in combination, an assembling and tying device having yarn clamping jaws, means, cooperating with said jaws, for assembling yarn ends between them in substantially the same position, and a tying bill adapted to be moved into operative contact with the assembled yarns.

60. Replenishing mechanism for winders having therein in combination, an assembling and tying device having yarn clamping jaws, means, cooperating with said jaws, for assembling yarn ends between them in substantially the same position, a tying bill adapted to be moved into operative contact with the assembled yarns, means for rotating said tying bill to form a knot, and means for setting and stripping said knot.

61. Replenishing mechanism for winders having therein in combination, an assembling and tying device having yarn clamping jaws, means, cooperating with said jaws, for sweeping laterally yarn ends between them into substantially the same central plane, and a tying bill adapted to be moved into operative contact with the assembled yarns by motion in said plane.

62. Replenishing mechanism for winders having therein in combination, an assembling and tying device having yarn clamping jaws, means, cooperating with said jaws, for assembling yarn ends between them in substantially the same position, a tying bill adapted to be moved into operative contact with the assembled yarns, means for rotating said tying bill to form a knot, and means for moving the tying bill away from the clamp to set and strip said knot.

63. Replenishing mechanism for a yarn handling machine having therein in combination means for assembling yarn ends to be united, means for clamping the assembled ends, a knot-tying device adapted to be moved in a reciprocal path toward and from the place of the assembled ends, and means for causing the knot-tying device to be actuated when positioned at one end of its path of motion to form the convolutions of a knot in said yarn ends.

64. Replenishing mechanism for a yarn handling machine having therein in combination means for assembling yarn ends to be united, means for clamping the assembled ends, a knot-tying device adapted to be moved in a reciprocal path toward and from the place of the assembled ends, means for causing the knot-tying device to be actuated when positioned at one end of its path of motion to form the convolutions of a knot in said yarn ends and means for moving the knot-tying device away from said clamping device in its path of motion for setting up and stripping the knotted ends from said tying device.

65. A knot-tying device having a shaft and tying bill thereon mounted for reciprocal motion toward and from the place of action of the tying bill to tie, in combination with an actuator therefor adapted to be moved in a longer reciprocal path to a greater extent than the tying bill shaft, a rack on the actuator engaging a pinion on the tying bill shaft, yielding means normally causing motion together of the actuator and tying bill shaft, and a stop determining the end of motion of said tying bill shaft in its path, whereby further motion of the actuator causes rotary tying movement of the operatively positioned tying bill.

66. A knot-tying device having a shaft and tying bill thereon mounted for reciprocal motion toward and from the place of action of the tying bill to tie, in combination with an actuator therefor adapted to be moved in a longer reciprocal path to a greater extent than the tying bill shaft, yielding means normally causing motion together of the actuator and tying bill shaft, and a stop determining the end of motion of said tying bill shaft in its path, whereby further motion of the actuator causes rotary tying movement of the operatively positioned tying bill, and means for locking the actuator and tying bill together during a part of return reciprocal motion, for the purpose of setting and stripping a knot by motion of the rotatively stationary tying bill away from its place of operation.

67. In a knot-tying device, a radius arm having a bearing therein for a tying bill shaft at an angle to its plane of motion, a tying bill shaft in said bearing, a pinion on said shaft, an actuator sector concentric with said radius arm having a segmental rack thereon engaging said pinion, a spring device normally holding said arm and sector in relatively fixed relation, means to rock said actuator sector to move said tying bill toward and away from a position for its operation, and a stop on a fixed part predetermining a limit of motion for said radius arm, said actuating sector having freedom for further motion to rotate said tying bill shaft.

68. In a knot tying device, a radius arm having a bearing therein for a tying bill shaft at an angle to its plane of motion, a tying bill shaft in said bearing, a pinion on said shaft, an actuator sector concentric with said radius arm having a segmental rack thereon engaging said pinion, a spring device normally holding said arm and sector in relatively fixed relation, means to rock said actuator sector to move said tying bill toward and away from a position for its operation, and a stop on a fixed part predetermining a limit of motion for said radius arm, said actuating sector having freedom for further motion to rotate said tying bill shaft, means for locking said sector and radius arm together after a predetermined rotation of said tying bill, and means to release said locking means during a return oscillation of said sector and arm.

69. In a replenishing mechanism for winding machines, the combination of a magazine for yarn supplies with feeding means adapted to move a yarn supply package from the magazine, means for supporting the supply package for rotation in its advanced position, a tying head bearing therein unwinding devices operative on a winding package and on said advanced supply package successively, and means for moving said unwinding means successively first into contact with one of said yarn packages and then into contact with the other.

70. In a replenishing mechanism for winding machine, the combination of a magazine for yarn supplies with feeding means adapted to move a bobbin from the magazine, means for supporting the bobbin for rotation in its advanced position, a tying head having therein unwinding devices operative on a winding package and on said advanced bobbin successively, and means for moving said unwinding means successively from contact with the winding package to contact with said advanced bobbin, end holding devices on said tying head, and assembling devices adapted to juxtapose the respective unwound ends.

71. In a replenishing mechanism for winding machine, the combination of a magazine for yarn supplies with feeding means adapted to move a bobbin from the magazine, means for supporting the bobbin for rotation in its advanced position, a tying head having therein unwinding devices operative on a winding package and on said advanced bobbin successively, and means for moving said unwinding means successively from contact with the winding package to contact with said advanced bobbin, end holding devices on said tying head, assembling devices adapted to juxtapose the respective unwound ends and tying devices for tying together the juxtaposed ends.

Signed by us at Wilton, New Hampshire, this fourth day of December, 1926.

EDWARD J. ABBOTT.
WILLIAM G. ABBOTT, Jr.